(12) United States Patent
Lilburn et al.

(10) Patent No.: US 9,739,873 B2
(45) Date of Patent: Aug. 22, 2017

(54) RANGE SIDELOBE SUPPRESSION

(71) Applicant: Navico Holding AS, Egersund (NO)

(72) Inventors: Lindsay Lilburn, Auckland (NZ);
Roger Phillips, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 450 days.

(21) Appl. No.: 14/463,448

(22) Filed: Aug. 19, 2014

(65) Prior Publication Data
US 2017/0102452 A1    Apr. 13, 2017

(51) Int. Cl.
G01S 7/285    (2006.01)
G01S 7/32     (2006.01)
G01S 13/28    (2006.01)

(52) U.S. Cl.
CPC .............. *G01S 7/32* (2013.01); *G01S 13/28* (2013.01); *G01S 13/284* (2013.01)

(58) Field of Classification Search
CPC ........... G01S 13/284; G01S 13/28; G01S 7/32
USPC .................................................. 342/89, 159
See application file for complete search history.

(56) References Cited

U.S. PATENT DOCUMENTS

| | | | |
|---|---|---|---|
| 3,808,594 A * | 4/1974 | Cook ....................... | G01S 13/26 342/201 |
| 4,021,805 A | 5/1977 | Effinger et al. | |
| 4,028,700 A | 6/1977 | Carey et al. | |
| 4,047,173 A | 9/1977 | Miller | |
| 4,114,154 A | 9/1978 | Sarfati | |
| 4,211,485 A | 7/1980 | Koreicho | |
| 4,216,474 A | 8/1980 | Levine | |
| 4,243,988 A | 1/1981 | Kang et al. | |
| 4,328,495 A | 5/1982 | Thue | |
| 4,353,067 A | 10/1982 | Mims | |
| 4,359,735 A * | 11/1982 | Lewis .................... | G01S 13/282 342/194 |
| 4,507,659 A * | 3/1985 | Lewis .................... | G01S 13/288 342/201 |
| 4,566,010 A | 1/1986 | Collins | |
| 4,586,048 A * | 4/1986 | Downie ................... | G01S 7/36 342/17 |
| 4,626,853 A | 12/1986 | Lee et al. | |
| 4,686,534 A | 8/1987 | Eddy | |
| 4,772,889 A | 9/1988 | Elleaume | |

(Continued)

FOREIGN PATENT DOCUMENTS

| | | |
|---|---|---|
| CN | 101464513 A | 6/2009 |
| JP | 2982769 B2 | 11/1999 |
| JP | 2009-128278 A | 6/2009 |

OTHER PUBLICATIONS

C. E. Cook and J. Paolillo, "A pulse compression predistortion function for efficient sidelobe reduction in a high-power radar," in Proceedings of the IEEE, vol. 52, No. 4, pp. 377-389, Apr. 1964.*

*Primary Examiner* — Marcus Windrich
(74) *Attorney, Agent, or Firm* — Nelson Mullins Riley & Scarborough LLP

(57) ABSTRACT

A system, apparatus, and method for receiving a signal. In one implementation, the system includes a receiver, a correlator, and a range sidelobe envelope generator. The receiver receives the signal. The correlator compresses the signal with a reference signal. The range sidelobe envelope generator generates a range sidelobe envelope function based on the compressed signal.

23 Claims, 18 Drawing Sheets

(56) References Cited

U.S. PATENT DOCUMENTS

| | | | |
|---|---|---|---|
| 4,800,388 A | 1/1989 | Okada | |
| 4,929,954 A | 5/1990 | Elleaume | |
| 4,989,010 A | 1/1991 | Crevoulin et al. | |
| 5,003,313 A | 3/1991 | Doriath | |
| 5,128,681 A | 7/1992 | McGroary et al. | |
| 5,128,683 A * | 7/1992 | Freedman | G01S 7/032 342/158 |
| 5,141,308 A | 8/1992 | Danckwerth et al. | |
| 5,151,702 A | 9/1992 | Urkowitz | |
| 5,173,706 A * | 12/1992 | Urkowitz | G01S 7/032 342/101 |
| 5,309,161 A * | 5/1994 | Urkowitz | G01S 13/526 342/111 |
| 5,389,933 A | 2/1995 | Golinsky | |
| 5,414,428 A * | 5/1995 | Gallagher | G01S 13/522 342/111 |
| 5,440,311 A * | 8/1995 | Gallagher | G01S 13/522 342/132 |
| 5,481,270 A * | 1/1996 | Urkowitz | G01S 13/582 342/101 |
| 5,786,788 A * | 7/1998 | Schober | G01S 13/288 342/159 |
| 5,834,986 A * | 11/1998 | Myers | H04L 27/2025 332/100 |
| 6,067,043 A | 5/2000 | Faure et al. | |
| 6,377,204 B1 | 4/2002 | Wurman et al. | |
| 7,019,686 B2 | 3/2006 | Hester et al. | |
| 7,106,250 B2 | 9/2006 | Blunt et al. | |
| 7,561,100 B2 * | 7/2009 | Shinonaga | G01S 13/28 342/189 |
| 7,675,458 B2 | 3/2010 | Hubbard et al. | |
| 7,688,257 B1 | 3/2010 | Christianson et al. | |
| 7,764,223 B2 | 7/2010 | Wade | |
| 8,022,863 B1 | 9/2011 | Nuthalapati | |
| 2008/0111734 A1* | 5/2008 | Fam | G01S 13/284 342/195 |
| 2009/0121920 A1 | 5/2009 | Mullarkey et al. | |
| 2012/0262332 A1* | 10/2012 | Ohnishi | G01S 7/32 342/135 |
| 2012/0293361 A1* | 11/2012 | Mowbray | G01S 7/2925 342/159 |

* cited by examiner

RANGE SIDELOBE SUPPRESSION

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

In radar systems, it is often important to have clear and unambiguous indications of the presence of a target. The presence of sidelobes are a common problem that arise in the signal processing of radar systems.

SUMMARY

Described herein are implementations of various technologies for a system, apparatus, and method for processing a signal. In one implementation, directed to a system for processing a signal, the system includes a receiver, a correlator, and a range sidelobe envelope generator. The receiver receives the signal. The correlator compresses the signal with a reference signal. The range sidelobe envelope generator generates a range sidelobe envelope function based on the compressed signal.

Described herein are also implementations of various technologies for an apparatus for processing a signal. The apparatus includes a receiver and a non-transitory computer-readable medium. The receiver receives the signal. The non-transitory computer-readable medium is connected to the receiver and has stored thereon computer-executable instructions. When the plurality of computer-executable instructions are executed by the computer, the plurality of computer-executable instructions cause the computer to perform various actions. These actions may include compressing the signal with a reference signal, resulting in a compressed signal. The computer can then generate a range sidelobe envelope function from the compressed signal.

Described herein are also implementations of various technologies of a method for receiving a radar signal. In one implementation, the method may include receiving the radar signal with a receiver. The radar signal can then be correlated with a reference signal, resulting in a compressed signal. A range sidelobe envelope function can then be generated based on the compressed radar signal.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
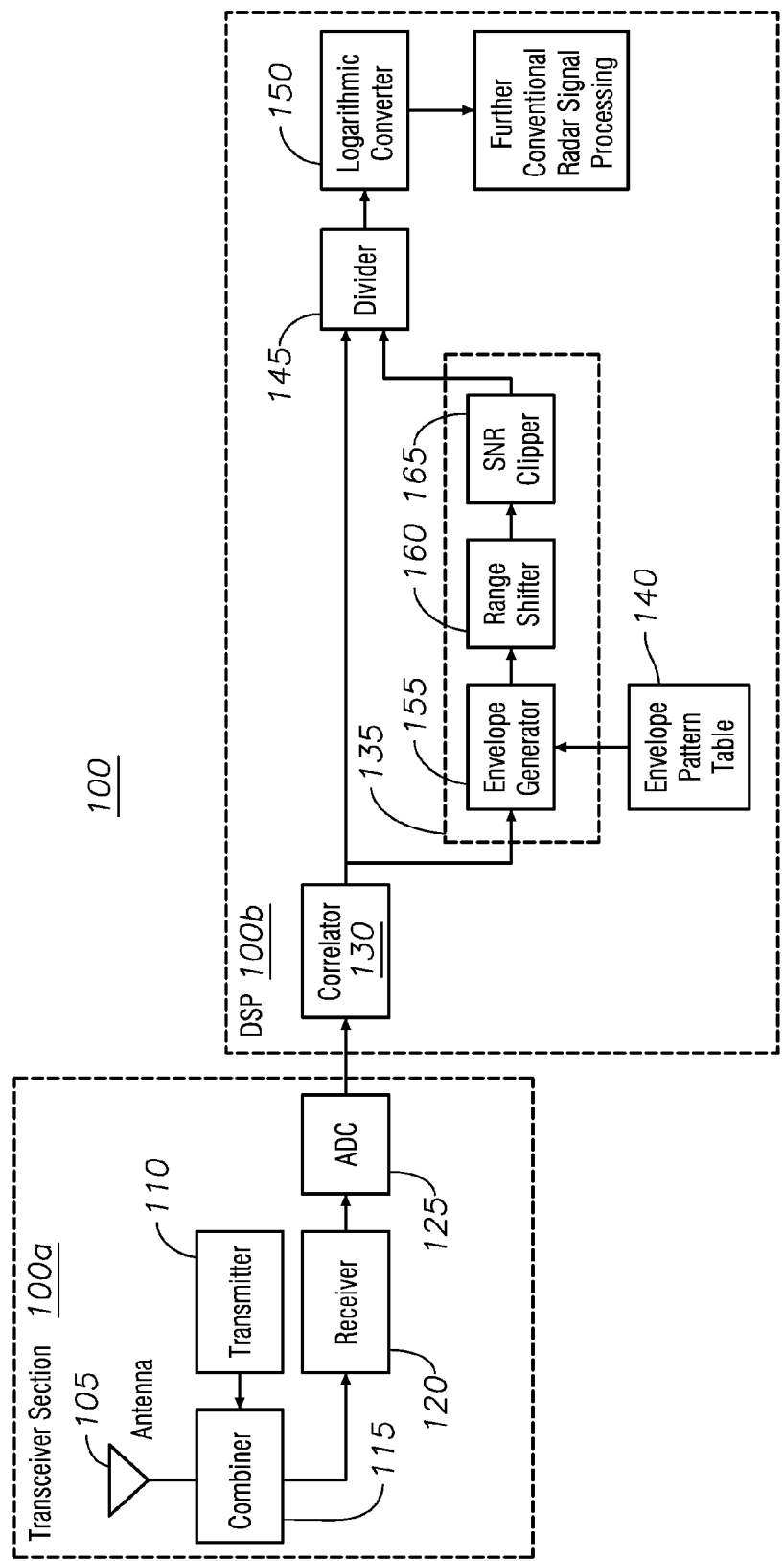
FIG. 1 illustrates a block diagram of a pulse compression radar system in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various implementations relating to a pulse compression radar system described herein, will now be described in more detail with reference to FIGS. 1-15.

I. Pulse Compression Radar

FIG. 1 illustrates a block diagram describing a pulse compression radar system 100 in accordance with techniques presented herein. The pulse compression radar system 100 locates an object(s) by transmitting and receiving signals, and determining a time delay(s). Additionally, the pulse compression radar system 100 suppresses an undesirable condition, known as range sidelobes.

A. Locations of an Object(s)

The pulse compression radar system 100 determines the distance of an object(s) by transmitting a signal, receiving a signal, and determining a time delay(s) between the signal that is received and the signal that is transmitted. If there is an object(s) in the direction of the signal that is transmitted, the signal that is transmitted reflects or echoes off of the object(s). After the signal that is transmitted reflects off of the detected object(s), the pulse compression radar system 100 receives the signal. The pulse compression radar system 100 can determine the distance the object(s) by determining a time delay between the reflected signal and the signal that was transmitted. The signal that are transmitted and reflected are known to travel at the speed of light, c. If the delay between the reflected signal and the signal that is transmitted is t, the distance that the signal has traveled equals ct. Since the signal makes a round-trip, the detected object(s) is half the distance that the signals travelled, or ct/2.

The pulse compression radar system 100 includes a transceiver section 100a and a digital signal processor 100b. The transceiver section 100a transmits signals and receives signals as will be described in greater detail below. The digital signal processor 100b determines the time delay between transmitted signals and the received signals, as will be described in greater detail below. The digital signal processor 100b also suppresses range sidelobes as will be described in greater detail below.

1. Transmitting Signals and Receiving Signals

The transceiving section 100a includes an antenna 105, transmitter 110, combiner 115, receiver 120, and an analog to digital converter (ADC) 125. The antenna 105 transmits a carrier frequency modulated by a baseband frequency signal ("transmitted signal" shall refer to the baseband signal of the signal transmitted by the antenna) and receives the reflected signal. The transmitter 110 prepares a signal for transmission. The transmitted signal is known as a "chirp" signal. A chirp signal is a signal with a frequency that increases or decreases over a period of time, linearly, exponentially or in any one of a variety of other ways. Accordingly, the combiner 115 between the transmitter 110 and the antenna 105 allows for transmission and reception of multiple frequencies. The receiver 120 receives the reflected signal, via the antenna 105, converts the reflected signal to the baseband frequency (the reflected signal converted to baseband frequency shall now be referred to as the received signal), and provides the received signal to the ADC 125. The receiver may alternatively convert the reflected signal to an intermediate frequency that may be sampled or sub-sampled by the ADC with the final conversion to baseband being performed by well-known digital methods. The ADC 125 digitizes the received signal at a constant sampling rate (now referred to as the digital domain). For purposes of this document, "received signal" shall refer to both the analog received signal and the digitized received signal. Time has a direct relationship with the number of samples produced by the ADC 125. In the digital domain, time can be measured in units of samples, where time t, equals, the number of samples generated divided by the sampling rate.

2. Determining a Time Delay(s)

As noted above, the digital signal processor 100b determines the time delay(s) between the transmitted signal and the received signal. In certain implementations, the digital signal processor 100b can be an appropriately configured field programmable gate array (FPGA). The digital signal processor 100b includes a correlator 130, a range sidelobe generator 135, an envelope pattern table 140, a divider 145, and a logarithmic converter 150. The correlator 130 compares the received signal with a reference for the transmitted signal (now referred to as the reference signal) to determine the time delay(s). The output of the correlator 130 is referred to as the compressed signal. The compressed signal identifies the time delay(s).

The range sidelobe generator 135 uses the compressed signal from the correlator 130, and an envelope pattern from the envelope pattern table 140 to generate a function, known as a range sidelobe envelope function. The range sidelobe envelope function mimics the range sidelobes in the compressed signal. The sidelobe generator 135 and envelope pattern 140 will be described in greater detail below.

The divider 145 receives the compressed signal from the correlator 130 and uses the output of the range sidelobe generator 135 to suppress the range sidelobes in the compressed signal. More specifically, the divider 145 receives the compressed signal and the output of the range sidelobe generator 135, and divides the compressed signal with the output of the range sidelobe generator 135. The result is a compressed signal with suppressed range sidelobes.

A logarithmic converter 150 converts the output of the divider 145 to the logarithmic domain. Alternatively, in one implementation, a logarithmic converter can convert the compressed signal and the output of the range sidelobe generator 135 to the logarithmic domain. A subtractor can then subtract the logarithmic conversion of the range sidelobe generator 135 from the logarithmic conversion of the compressed signal.

The correlator 130 uses a process known as correlation. Correlation compares the received signal to a reference signal to determine the time delay(s). The correlator 130 measures the correlation of the reference signal and the received signal offset by differing numbers of samples (now referred to as sample numbers). As noted above, the received signal is digitized by the ADC 125 at a particular sampling rate. The correlator 130 uses a reference signal that is digitized at the same sampling rate. The correlation of the received signal and the reference signal as a function of the sample number is known as the "compressed signal." Generally, the correlation values will have a noticeable spike(s) at sample number(s) corresponding to a time delay(s) between the received signal and the transmitted signal. Correlation values that exceed a predetermined threshold for a particular sample number(s) may be deemed to correspond to time delay(s). The received signal will be described in greater detail with reference to FIG. 3. The reference signal will be described in greater detail with reference to FIG. 4. The compressed signal will be described in greater detail with reference to FIG. 5.

The compressed signal output from the correlator 130 can have an undesirable condition known as range sidelobes. Range sidelobes are elevated correlation levels in the compressed signal surrounding a sample number corresponding to an object that is large in size. As noted above, time delay(s) are associated with objects in the direction of the transmitted signal. Objects that are large in size may cause range sidelobes in the compressed signal. Range sidelobes will be described below in greater detail with reference to FIG. 5.

B. Range Sidelobe Suppression

The range sidelobe generator 135 includes an envelope generator 155, a range shifter 160, and a minimum signal to noise (SNR) adjuster and clipper (SNR clipper) 165. The envelope generator 155, range shifter 160, and SNR clipper 165 will each be described in greater detail below.

For purposes of this document, "range sidelobe envelope function" shall refer to, except for inputs to the range sidelobe envelope generator 135, any signal produced by or within the range sidelobe generator 135 and any treatment or conditioning thereof, such as, but not limited to, aligning, clipping, and domain conversion, and shall also refer to the function that is used to reduce the range sidelobes in the compressed signal by, for example a divider or subtractor.

The envelope generator 155 uses the compressed signal, and a selected range sidelobe envelope pattern from an envelope pattern table 140, to generate the range sidelobe envelope function. The envelope pattern table 140 may include a memory that stores a number of range sidelobe envelope patterns as digitized signals. The range sidelobe envelope pattern will be described in greater detail with reference to FIG. 6. The envelope generator 155 will be described in greater detail with reference to FIGS. 7-9. The range sidelobe envelope function output of the envelope generator 155 includes a region that mimics the range sidelobes of the compressed signal. However, (1) the region that mimics the range sidelobes of the compressed signal is not aligned with the sidelobes; and (2) the range sidelobe envelope function includes regions that have negative values.

As such, the range shifter 160 aligns the range sidelobe envelope function with the compressed signal, as will be described in greater detail with reference to FIG. 10. The SNR clipper 165 raises values of the range sidelobe envelope function that are below a predetermined value, usually the predetermined value is close to zero decibels, to the predetermined value (now referred to as "clipping"). In certain implementations, the SNR clipper 165 can include a circuit, hardware, or a digital signal processor. The SNR clipper 165 will be described in greater detail with reference to FIG. 11A. The range sidelobe generator 135 provides the output of the SNR clipper 165 that mimics the range sidelobes to the divider 145. The divider 145 divides the compressed signal from the correlator 130 with the output of the range sidelobe generator 135, resulting in a compressed signal with reduced range sidelobes. The output of the divider 145 will be described in greater detail with reference to FIG. 12.

II. Method for Locating an Object(s)

Figure 2A:
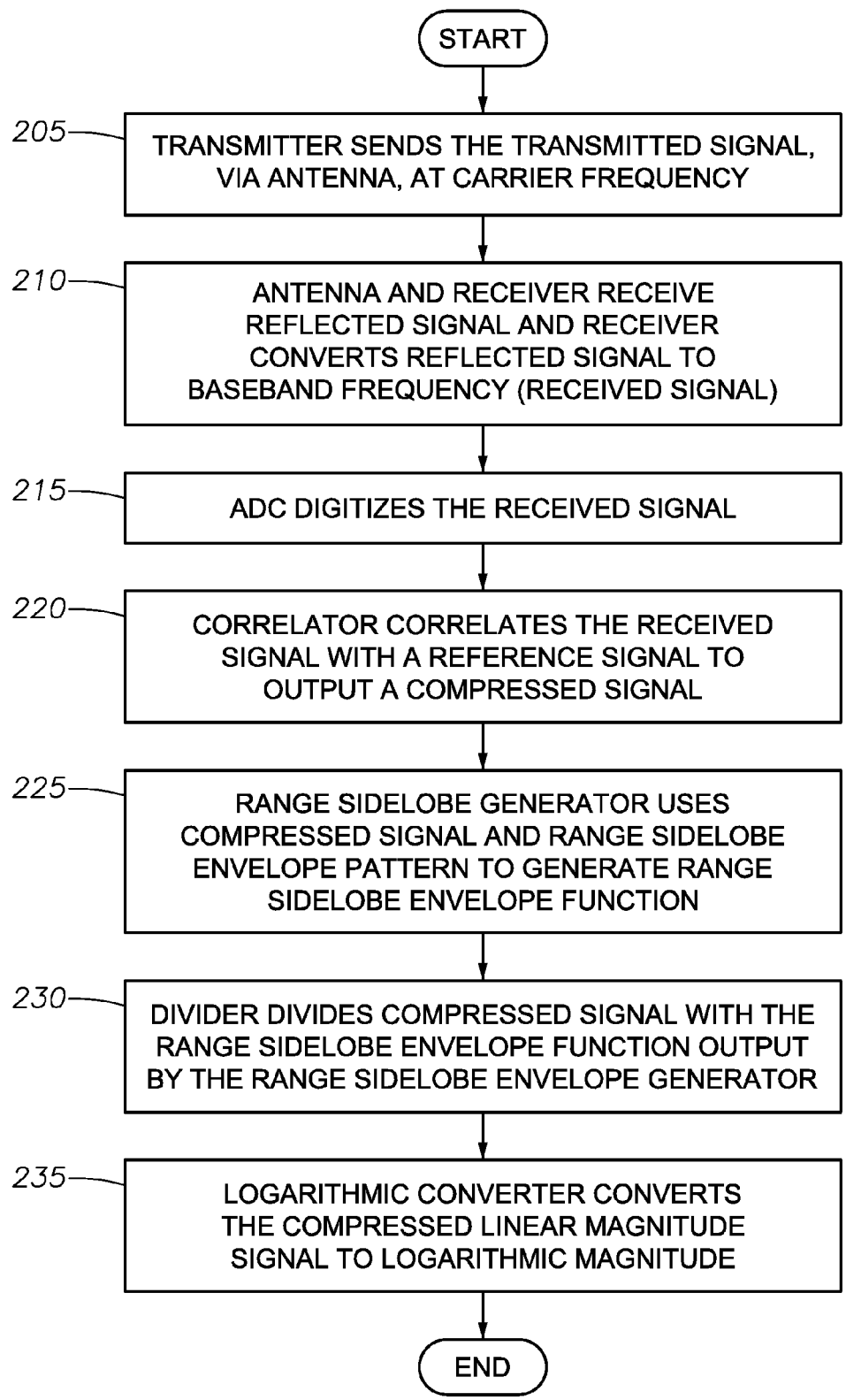
FIG. 2A illustrates a flow diagram of a method for locating an object(s) in accordance with implementations of various techniques described herein.
Figure 2B:
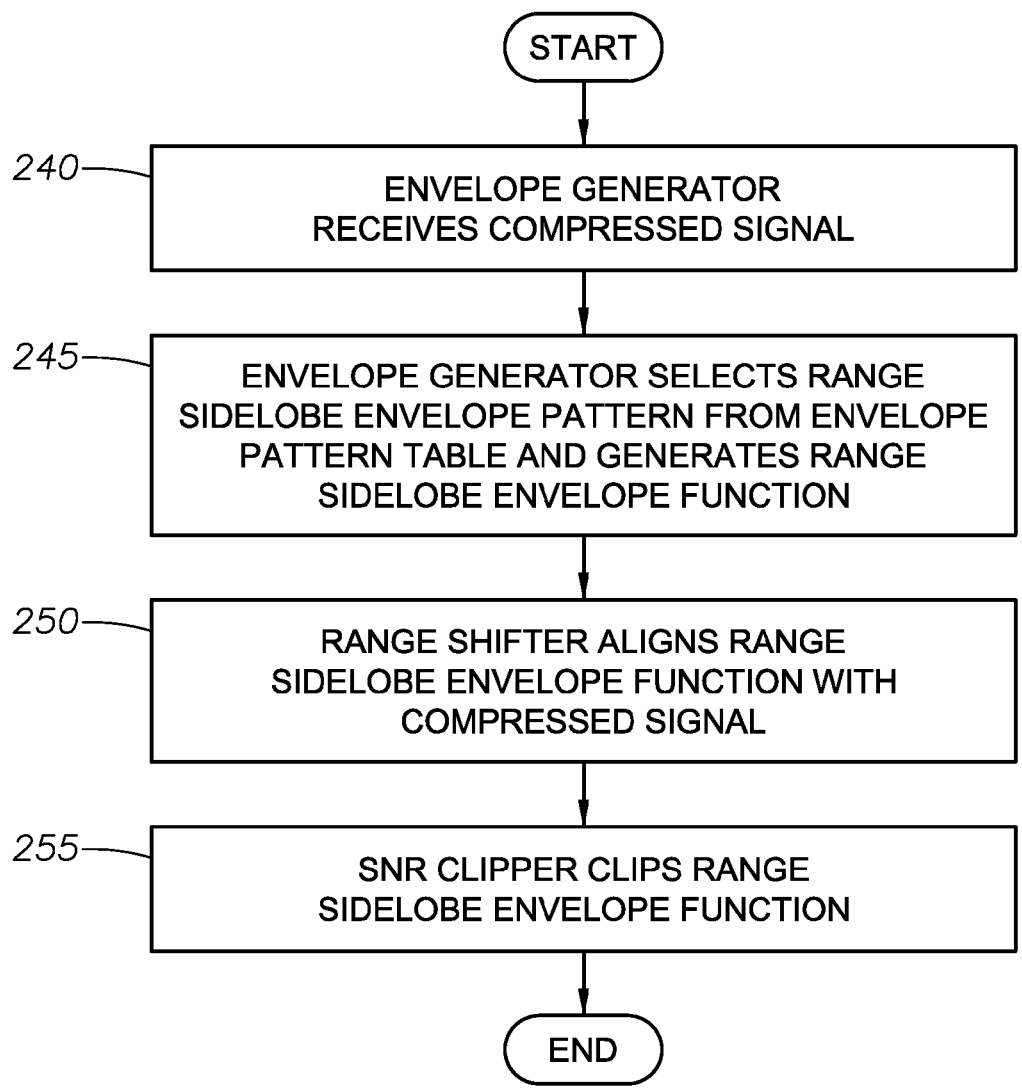
FIG. 2B illustrates a flow diagram of a method for suppressing range sidelobes in accordance with implementations of various techniques described herein.

FIGS. 2A-2B are flow diagrams in accordance with techniques described herein. In general, the pulse compression radar 100 detects the location of an object(s) by (1) transmitting a signal and receiving a signal; (2) determining a time delay(s) between the transmitted signal and received signal; and (3) suppressing the range sidelobes. Transmitting a signal and receiving a signal are described at steps 205-215 in FIG. 2A. Determining the time delay(s) between the transmitted signal and the received signal is described at steps 220-235 in FIG. 2A. Suppressing the range sidelobes is described at steps 240-255 in FIG. 2B. It should be understood that while the methods shown in FIGS. 2A-2B may indicate a particular order of execution of operations, in some implementations, certain portions of the operations might be executed in a different order. Further, in some implementations, additional operations or steps may be added to the methods. Likewise, some operations or steps may be omitted.

A. Transmitting a Signal and Receiving a Signal

FIG. 2A is a flow diagram in accordance with techniques described herein. At step 205, the transmitter 110 transmits the signal via antenna 105. At step 210, the antenna 105 and the receiver 120 receive the reflected signal and the receiver 120 converts the reflected signal to the received signal. At step 215, the ADC 125 digitizes the received signal, resulting in a digitized signal. The received signal will be described in greater detail with reference to FIG. 3 described below.

Figure 3:
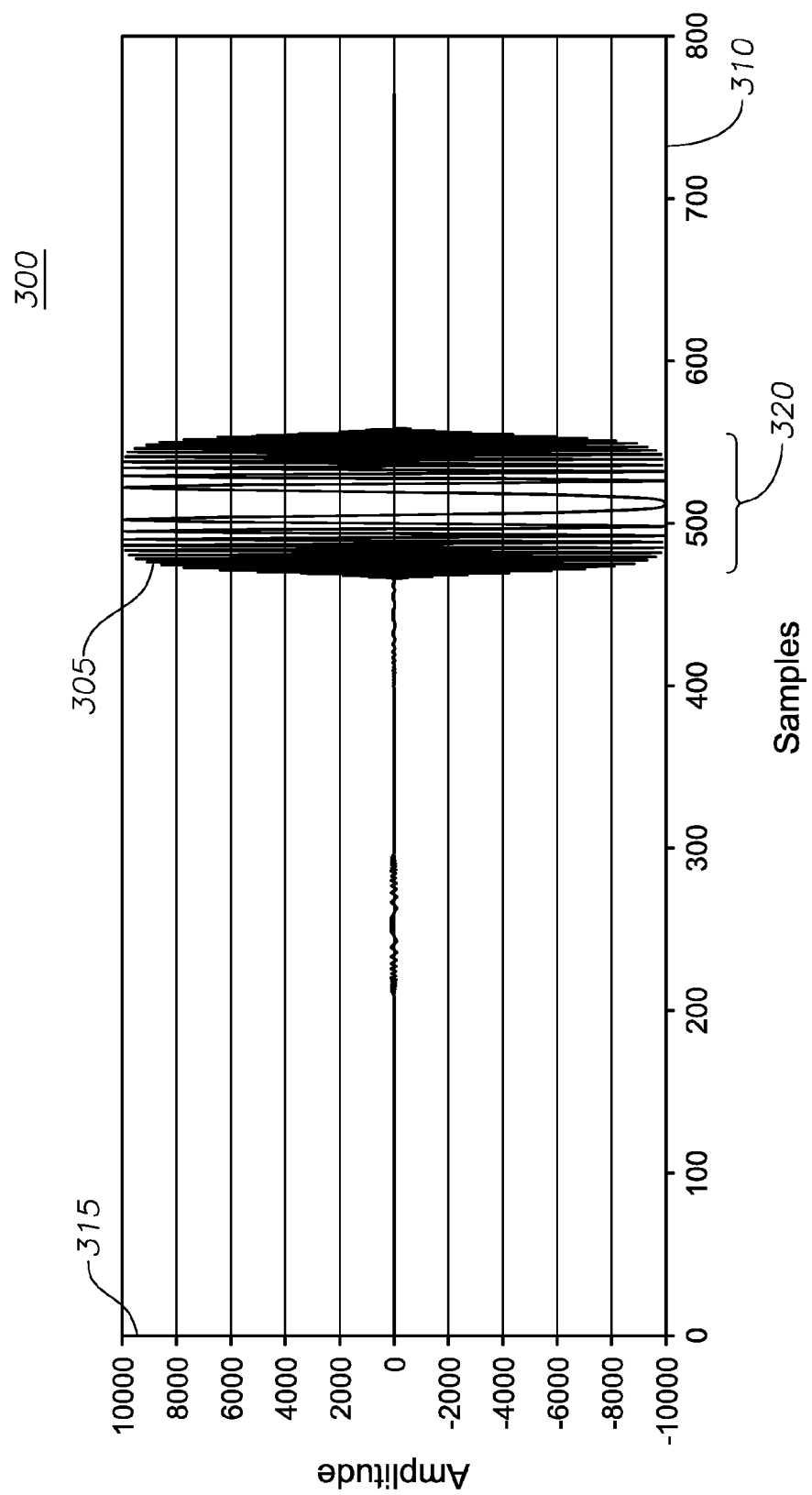
FIG. 3 is a graph of a received signal in accordance with implementations of various techniques described herein.

FIG. 3 is a graph 300 of the received signal 305 referred to at step 215. The horizontal axis 310 indicates the sample numbers for the received signal 305. The vertical axis 315 indicates the amplitude normalized to +/−1 for the received signal 305. The received signal 305 has an almost zero amplitude until, approximately sample number 480. However, starting at approximately sample number 480 until approximately sample number 550 (region 320), there is considerable activity in the received signal 305. A time delay is likely to correspond to a time, t, associated with sample number 480 (420/sampling rate). An object is likely to be located at a distance equal to tc/2. For convenience, the time delay in the digitized domain shall now be referred to as the sample delay.

B. Determining the Time Delay(s)

Referring back to FIG. 2A, at step 220, the correlator 130 correlates the received signal with a reference signal, outputting the compressed signal. The reference signal will be described in greater detail with reference to FIG. 4 described below.

Figure 4:
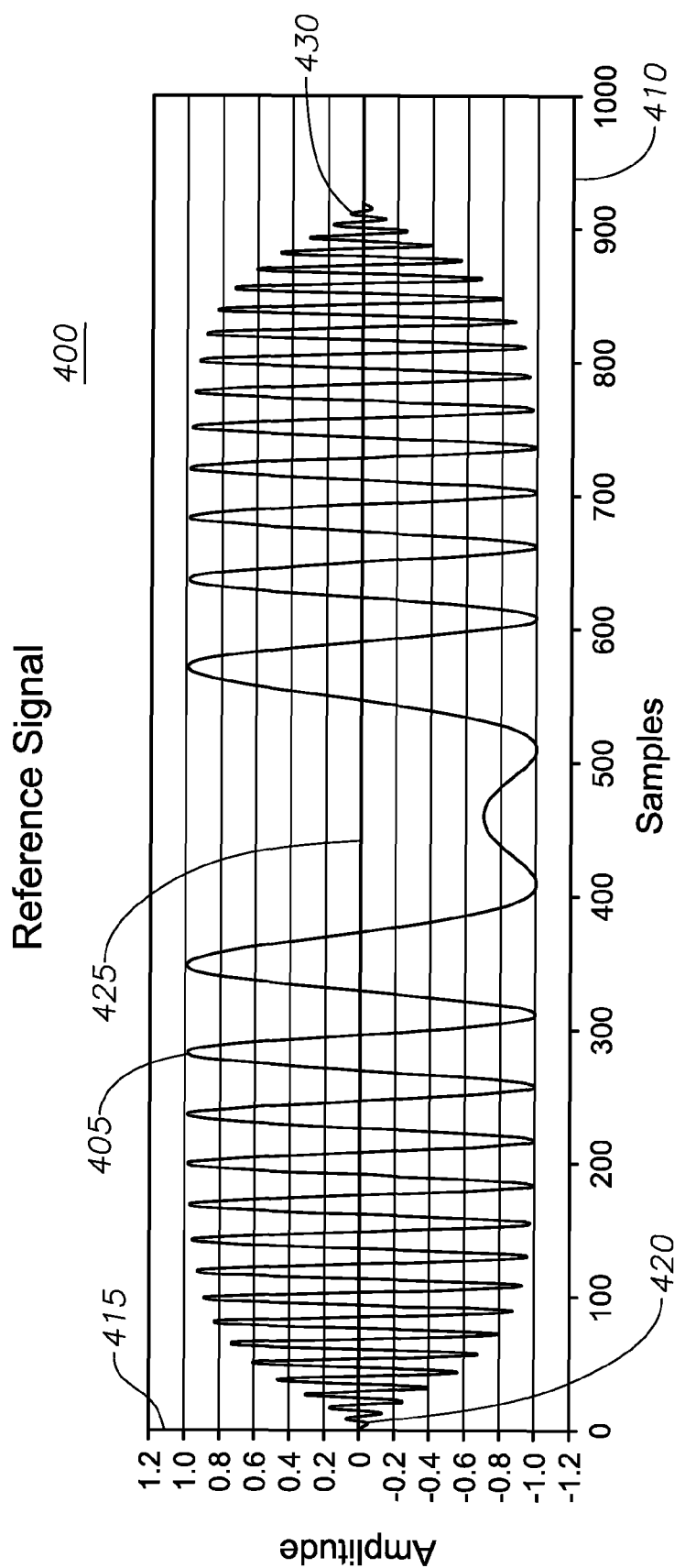
FIG. 4 is a graph of a reference signal in accordance with implementations of various techniques described herein.

FIG. 4 is a graph 400 of the reference signal 405. The horizontal axis 410 indicates the sample numbers for the reference signal 405. The vertical axis 415 indicates the amplitude for the reference signal 405. The amplitude is measured in amps. As noted above, the reference signal 405 represents the transmitted signal. The transmitted signal is a chirp signal from sample 0 (420) that is centered at 0 Hz at sample 450 (425), and continues until sample 900 (430). The length, number of samples=900, is referred to as the length of the "burst." The reference signal can then be correlated with the received signal. The correlation is performed with quadrature versions (I/O) of the reference and received signal, where I represents the magnitude with 0 degrees phase shift and Q represents the magnitude with 90 degrees phase shift.

The compressed signal will be described in greater detail with reference to FIG. 5. As noted above at step 220, the correlator 130 determines the sample delay between the received signal 305 and reference signal 405, by comparing the received signal 305 and the reference signal 405 at different numbers of samples of delay, and determining correlation values at the different numbers of samples of delay. The correlation values, as a function of the numbers of samples of delay, is the compressed signal.

Figure 5:
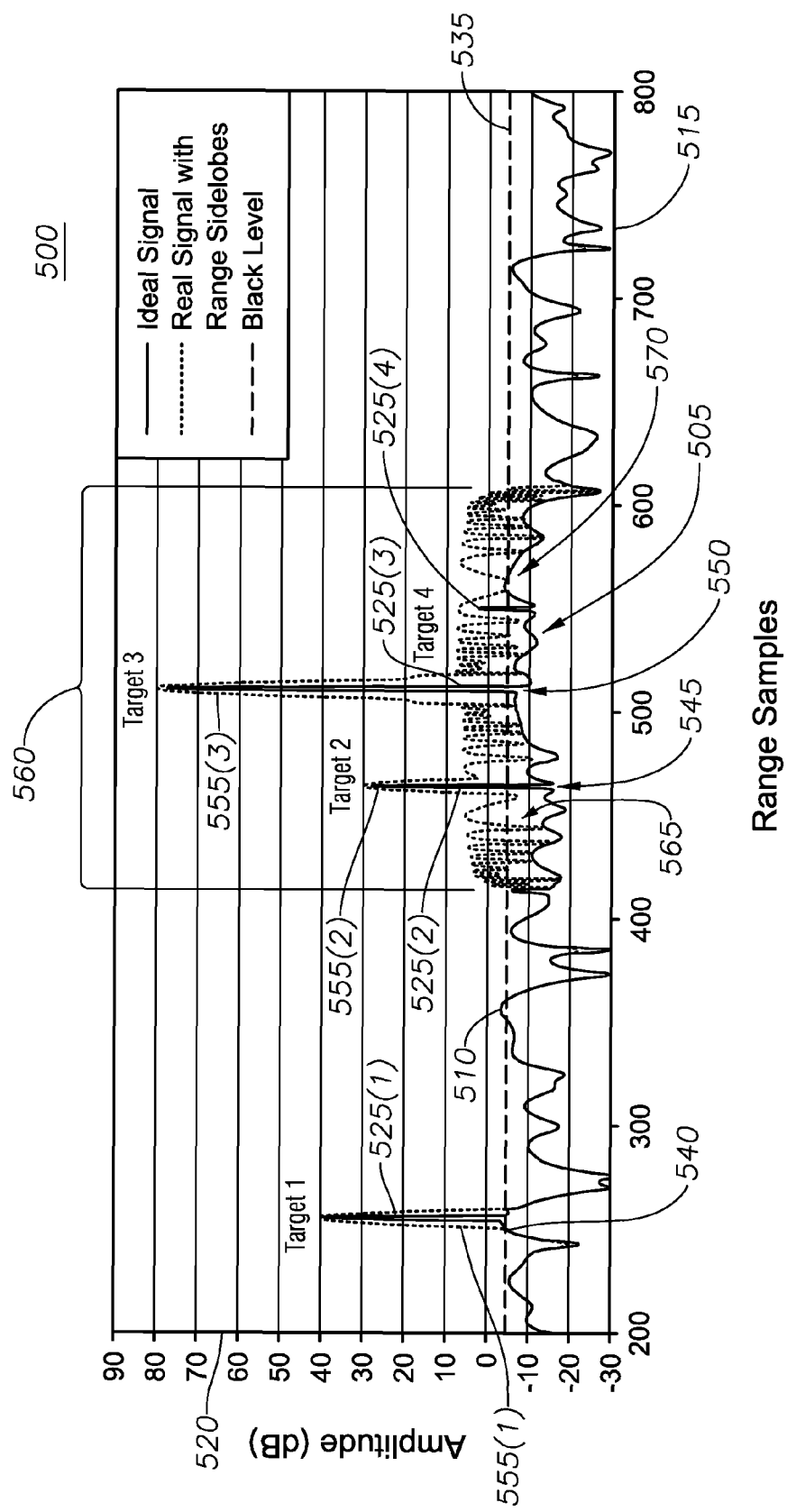
FIG. 5 is a graph of a compressed signal in accordance with implementations of various techniques described herein.

FIG. 5 is a graph 500 of a compressed signals 505, 510. The compressed signals include an ideal compressed signal 505 that does not have range sidelobes and an actual compressed signal 510. The actual compressed signal 510 has range sidelobes. The horizontal axis 515 indicates the numbers of samples of delay between the received signal and the reference signal. The vertical axis 520 indicates the correlation value, measured in decibels.

The ideal compressed signal 505 has generally low values, usually below 0 decibels. However, at sample numbers that correspond to detected targets, the ideal compressed signal 505 has unusually sharp spikes in correlation values, such as spikes 525(1), 525(2), 525(3), and 525(4), corresponding to Target 1, Target 2, Target 3, and Target 4. The compressed signal is useful for determining the location of the object(s) because of the spikes 525. The spikes are useful because only a very small range of sample numbers 525(1), 525(2), 525(3), and 525(4) have the elevated correlation value. For example, a visual inspection of spike 525(1) shows that sample numbers 530 may corresponds to no more than 5 sample numbers, e.g., sample numbers 248-252 (540). The small number of possible samples 540 allow the numbers of samples of delay (and accordingly, the distance) associated with Target 1 to be determined with a high degree of precision. Therefore, if a threshold line 535 were to be declared such that only sample numbers with correlation values that exceeded the threshold line 535 were associated with targets, only a very few sample numbers 540, 545, and 550 would exceed the threshold line 535.

The actual compressed signal 510 has range sidelobes. The actual compressed signal 510 includes spikes 555(1), 555(2), and 555(3) ("spike" 555(4) is masked by the range sidelobes), associated with Targets 1, Targets 2, and Target 3. Spike 555(3) associated with Target 3 has an unusually high correlation value, e.g., 80 decibels, and is therefore likely to be a large object. Large objects in the direction of the transmitted signal are likely to introduce a specific type of noise in the received signal. The specific type of noise in the received signal causes range sidelobes 560 to appear in the actual correlation signal 510. Range sidelobes 560 are elevated levels of correlation in the compressed signal in regions 565, 570 surrounding the spike 555(3). As a result of the range sidelobes 560, numerous sample numbers in the regions 565, 570 surrounding the Target 3, exceed the threshold line 535. The numerous sample numbers with correlations exceeding the threshold line interfere with identification of the time delay(s).

Referring back to FIG. 2A, at step 225 (described in greater detail with reference to FIG. 2B), the range sidelobe generator 135 uses the compressed signal and a selected range sidelobe envelope pattern from the envelope pattern table 140 to generate a range sidelobe envelope function, which will be described in greater detail with reference to FIG. 6-11. At step 230, the divider 145 divides the compressed signal with the range sidelobe envelope function to suppress the sidelobes in the compressed signal. The compressed signal with suppressed sidelobes will be described in greater detail with reference to FIG. 12. At step 235, the logarithmic converter 150 logarithmically converts the compressed signal with suppressed sidelobes to the linear domain.

C. Range Sidelobe Generation

FIG. 2B is a flow diagram in accordance with techniques described herein. At step 240, the envelope generator 155 receives the compressed signal. At step 245, the envelope generator 155 selects a range sidelobe envelope pattern from the envelope pattern table 140 and generates a range sidelobe envelope function. In certain implementations, the range sidelobe envelope pattern can be static and stored in a look-up-table that is then accessed by the envelope generator 155. One advantage of using a static function (or set of static functions if there is more than one type of chirp transmitted) is that the range sidelobes 560 are a function of the auto-correlation mathematics and so are time invariant. The range sidelobe envelope pattern is described in greater detail with reference to FIG. 6. The output of the envelope generator 155 includes a region that mimics the range sidelobes of the compressed signal. However, (1) the region that mimics the range sidelobes of the compressed signal is not aligned with the range sidelobes of the compress signal; and (2) includes regions that have negative values. The envelope generator 155 will be described in greater detail with reference to FIG. 7-8. The range sidelobe envelope function output by the envelope generator 155 will be described with reference to FIG. 9. At step 250, the range shifter 150 aligns the range sidelobe envelope function with the compressed signal, as will be described in greater detail with reference to FIG. 10. The SNR clipper 165 clips the range sidelobe envelope function at step 255, as will be described in greater detail with reference to FIG. 11A. The range sidelobe generator 135 outputs (at step 225, FIG. 2A) the range sidelobe envelope function generated at step 255 for use by the divider 145 at step 230.

III. Range Sidelobe Generation

A. Selecting a Range Sidelobe Envelope Pattern

At step 240, the envelope generator 155 receives the compressed signal 510 and selects a range sidelobe envelope pattern from the envelope pattern table 140. As noted above, the envelope pattern table 140 can store numerous different range sidelobe envelope patterns.

Figure 6:
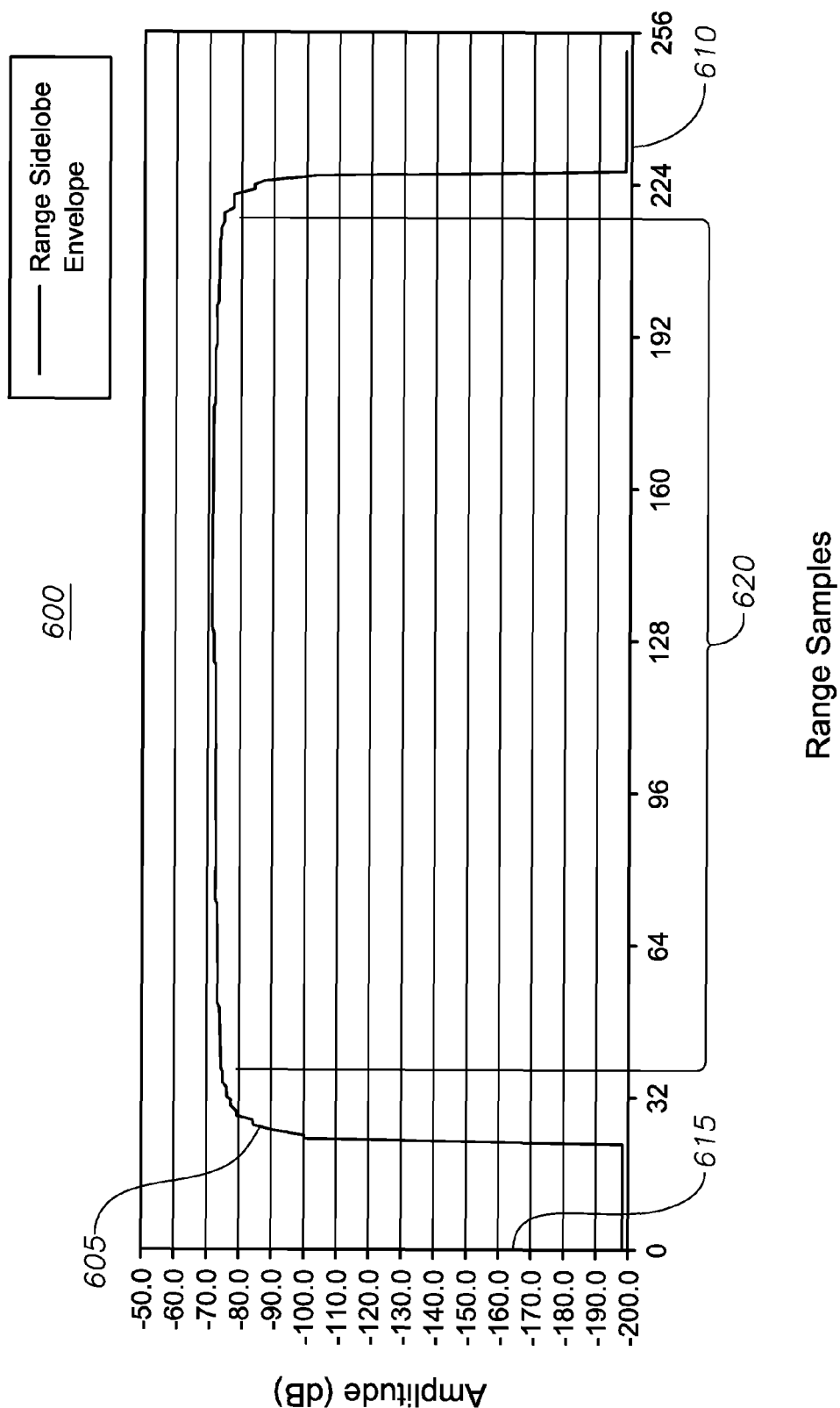
FIG. 6 is a graph of a range sidelobe envelope pattern in accordance with implementations of various techniques described herein.

FIG. 6 is a graph 600 of a range sidelobe envelope pattern 605 referred to at step 245 above. The horizontal axis 610 indicates the sample numbers for the range sidelobe envelope pattern 605. The vertical axis 615 indicates the amplitude. The amplitude is measured in decibels. The range sidelobe envelope pattern 605 includes has 256 samples, of which sample numbers 0 to 24, and sample number 225 to step 255 have an extremely low amplitude, e.g., −200 decibels. However, samples 25-224, region 620, have a sharply higher amplitude level, e.g., −70 decibels.

B. Generating a Range Sidelobe Envelope Function

Figure 7:
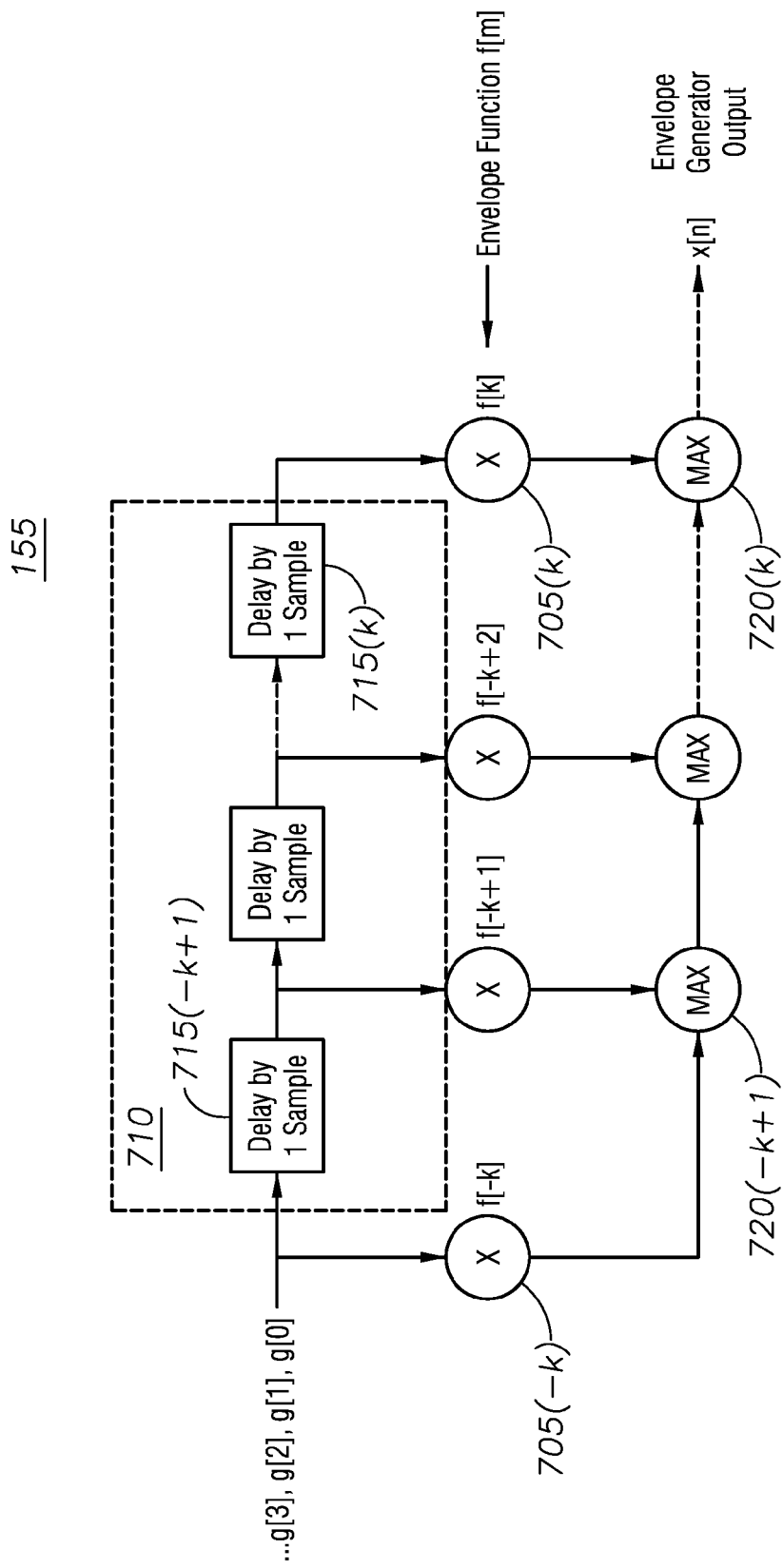
FIG. 7 illustrates a block diagram of an envelope generator in accordance with implementations of various techniques described herein.

FIG. 7 illustrates a block diagram of the envelope generator 155 mentioned at step 245 above. The envelope generator 155 receives the compressed signal 510 and the range sidelobe envelope pattern 605. As noted above, both the compressed signal 510 and the range sidelobe envelope pattern 605 are functions of sample numbers. Accordingly, the compressed signal 510 shall be mathematically expressed as g[n], wherein n is the sample number. The range sidelobe envelope pattern shall be mathematically expressed as f[m], wherein m is the sample number.

The range sidelobe envelope function shall be mathematically expressed as x[n]. The range sidelobe envelope function, x[n], is generated using the following function:

$$x[n] = \mathop{\text{MAX}}_{m=-k}^{m=+k} f[m]g[n-m]$$

where g[n]=the compressed signal f[m]=range sidelobe envelope pattern k=half-width of the range sidelobe envelope function For example, in the case of range sidelobe envelope pattern 605, the width is approximately 256 samples, resulting in k equal to approximately 128 samples. The above function is effectively a convolution but instead of using a sliding summation, a sliding maximum is taken.

The envelope generator 155 includes a 2 k+1 multipliers 705(−k) ... 705(k), a shift register 710 with 2 k shift units 715(−k+1) ... 715(k), and 2 k maximum comparators 720(−k+1) ... 720(k). The range sidelobe envelope generator 155 receives samples of the compressed input signal 510 at the multiplier 705(−k) and shift unit 715(−k+1).

The shift register 710 shifts in consecutive samples of the compressed signal 510, g[n+k] ... g[n−k]. The multipliers 705(−k) ... 705(k) perform the following multiplications:

| | |
|---|---|
| g[n+k]*f[−k] | Multiplier 705(−k): |
| g[n+k−1]*f[−k+1] | Multiplier 705(−k+1): |
| g[n+k−2]*f[−k+2] | Multiplier 705(−k+2): |
| : | |
| g[n−k]*f[k] | Multiplier 705(k): |

The maximum comparators 720(−k+1) ... 720(k) receive the outputs of the multipliers 705(−k+2) ... 705(k−1) and maximum comparators 720(−k+1) ... 720(k−1). The multiplier 705(−k+1) receives the most recent compressed signal sample. The maximum comparator 720(k) stores maximum value of g[n+k]f[−k] ... g[n−2 k−1]*f[k]. After each shift, (1) the envelope generator 135 receives the next most recent sample of the compressed signal, e.g., g[n+1], each shift unit 715(−k+1) ... 715(k−1); (2) provides its output to the next successive shift unit 715(−k+2) ... 715(k), respectively; and (3) the maximum comparator 720(k) provides the next sample of the sidelobe envelope, x[n].

Figure 8:
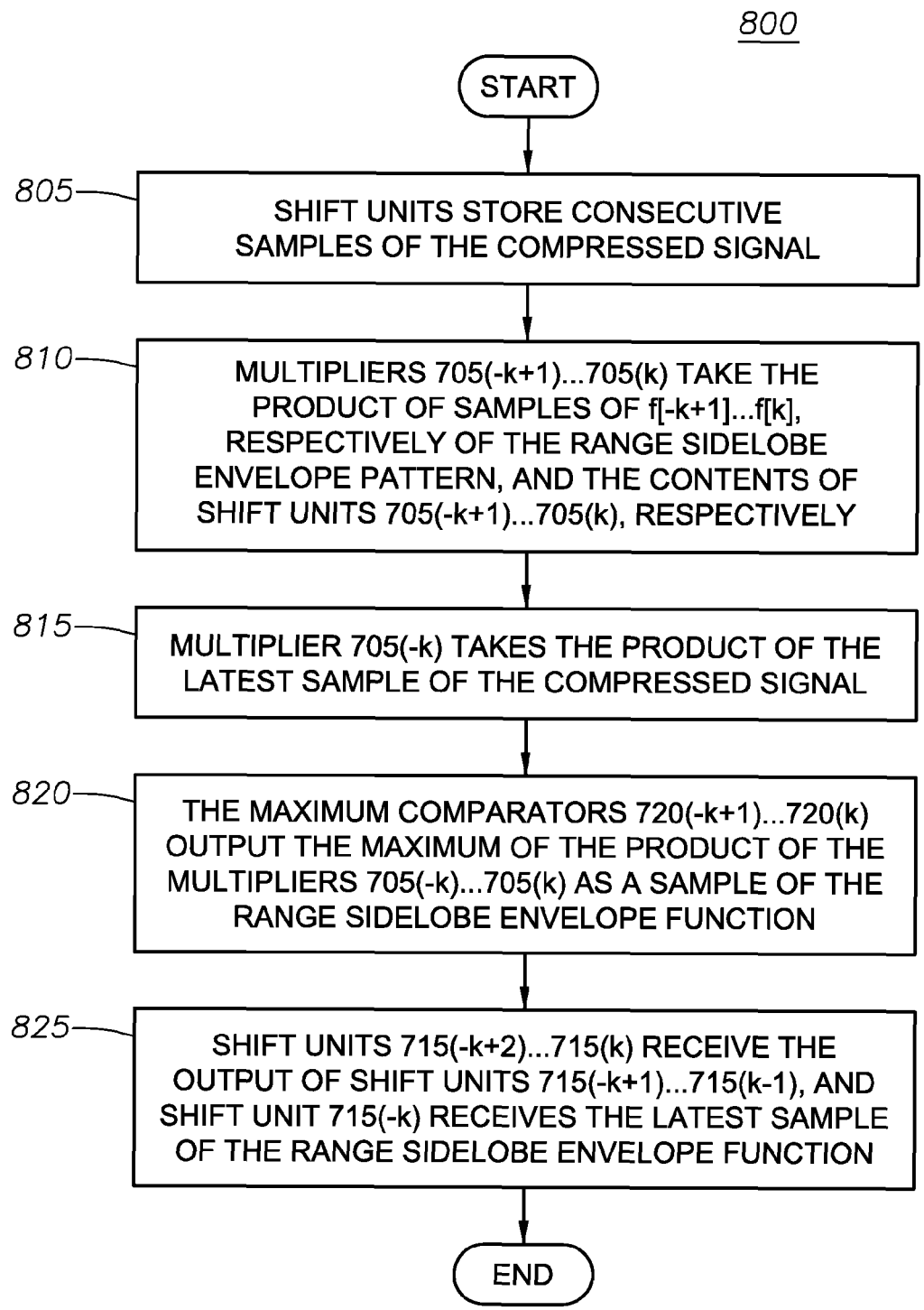
FIG. 8 illustrates a flow diagram of a method for generating a range sidelobe envelope function in accordance with implementations of various techniques described herein.

FIG. 8 is a flow diagram for a method for generating a range sidelobe envelope function in accordance with implementations of various techniques described herein. In one implementation, the method in FIG. 8 is performed by the envelope generator 155 described in FIG. 7. At step 805, the shift units 715(−k+1) ... 715(k) store consecutive samples of the compressed signal, where shift unit 715(−k+1) stores a later sample of the compressed signal then 715(k). At step 810, multipliers 705(−k+1) ... 705(k) take the product of samples of f[−k+1] ... f[k], respectively of the range sidelobe envelope pattern, and the contents of shift units 715(−k+1) ... 715(k), respectively. At step 815, multiplier 705(−k) takes the product of the latest sample of the compressed signal 510 with range sidelobe envelope pattern sample, f[−k]. At step 820, the maximum comparators 720(−k+1) ... 720(k) output the maximum of the product of multipliers 705(−k) ... 705(k). The maximum of the products during step 820, is output as a sample of the range sidelobe envelope function. At step 825, shift units 715(−k+2) ... 715(k) receive the contents of shift units 715(−k+1) ... 715(k−1), respectively, while the shift unit 715(−k) receives the latest sample of the compressed signal 510. The envelope generator 155 repeats steps 805-825, outputting a new sample of the range sidelobe envelope function at each iteration, with a k-sample delay.

Figure 9:
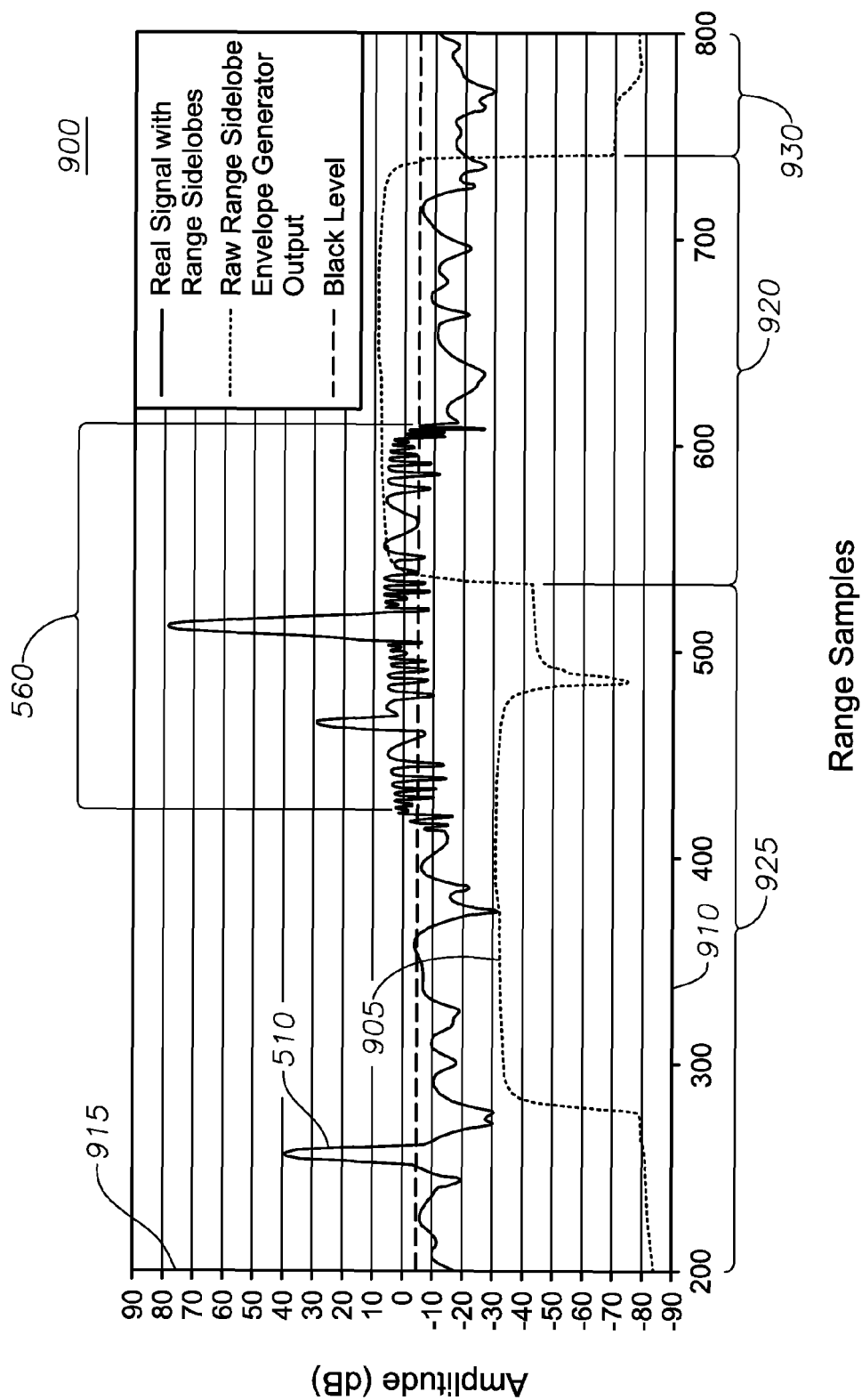
FIG. 9 is a graph of a range sidelobe envelope function in accordance with implementations of various techniques described herein.

FIG. 9 is a graph 900 of a range sidelobe envelope function 905 referred to at step 245 above. In one implementation, the range sidelobe envelope function 905 is the output of FIG. 8. The horizontal axis 910 indicates the sample number for the range sidelobe envelope function 905. The vertical axis 915 indicates the amplitude of the range sidelobe envelope function 905. The amplitude is measured in decibels. The graph 900 also includes compressed signal 510 with the range sidelobes 560.

As noted above, the range sidelobe envelope function 905 mimics the sidelobes 560. The range sidelobe envelope function 905 includes an elevated region 920 that has almost the same amplitude and sample number width as the range sidelobes 560. However, (1) the elevated region 920 is not aligned with the range sidelobes 560 of the compressed signal 510; and (2) the regions apart from the elevated region 920 (region 925 and region 930) have significantly negative values.

1. Aligning the Range Sidelobe Envelope Function

Figure 10:
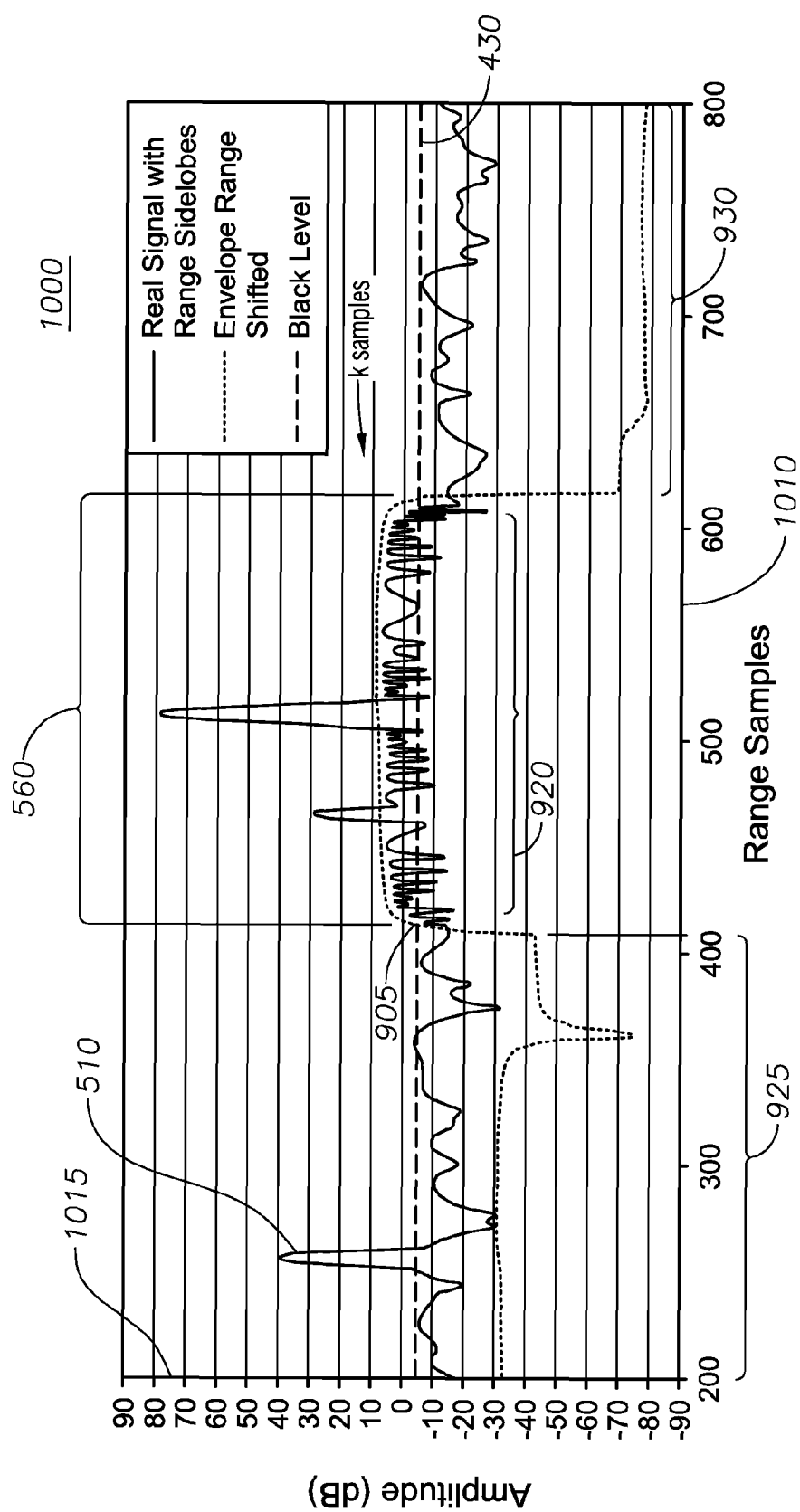
FIG. 10 is a graph of a range sidelobe envelope function output by a range shifter in accordance with implementations of various techniques described herein.

FIG. 10 is a graph 1000 of the range sidelobe envelope function 905 output from the range shifter 145 that was referenced at step 250 in FIG. 2B. The horizontal axis 1010 indicates the sample number for the range sidelobe envelope function 905. The vertical axis 1015 indicates the amplitude of the range sidelobe envelope function 905. The range shifter 145 aligns the range sidelobe envelope function 905 by shifting the range sidelobe envelope function 905 by half the width of the range sidelobe envelope pattern 605, e.g., k or approximately 128 samples. The elevated region 920 now completely encases the range sidelobes 560, by both the sample numbers and the magnitude.

2. Clipping the Range Sidelobe Envelope Function

Figure 11A:
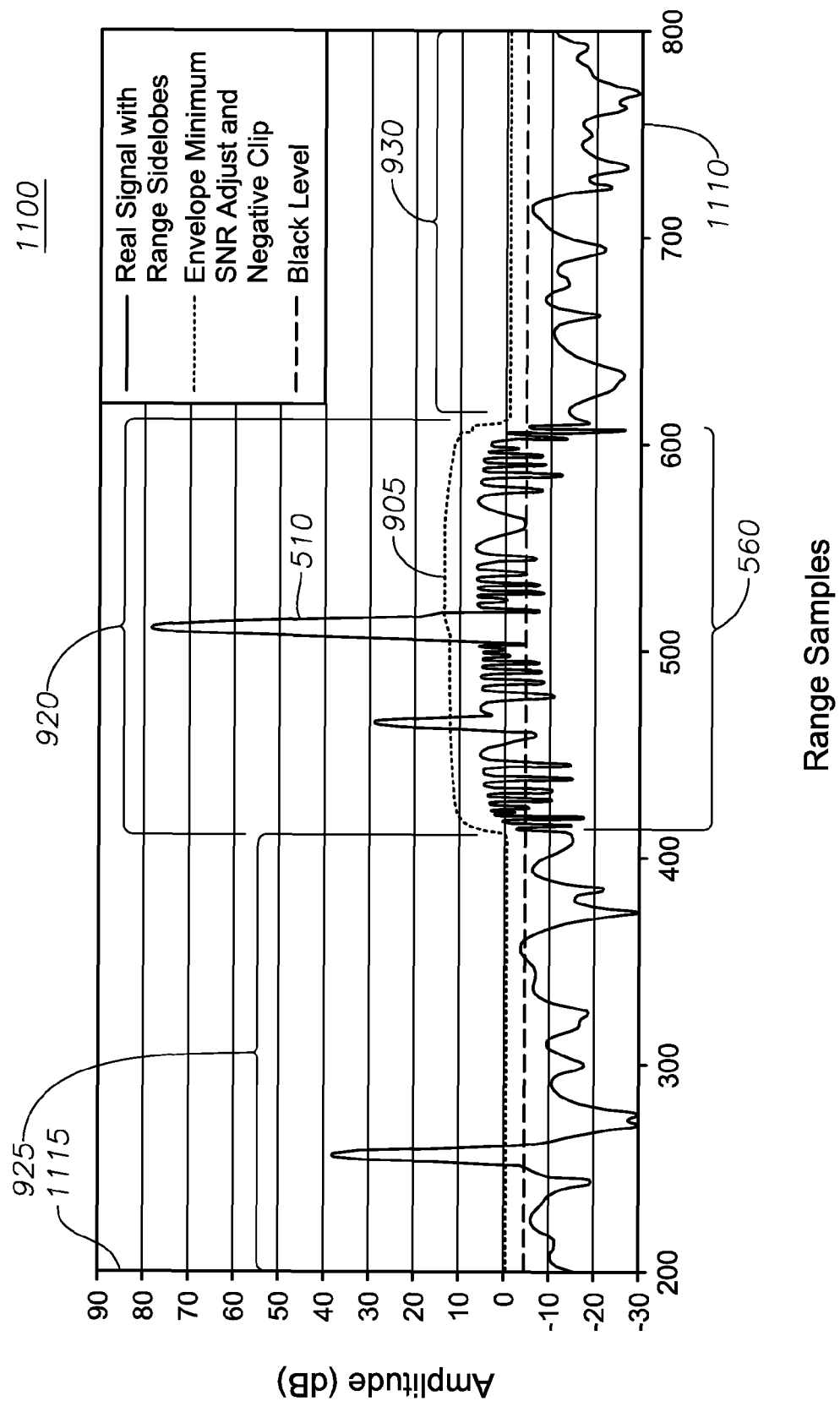
FIG. 11A is a graph of a range sidelobe envelope function output by an SNR clipper in accordance with implementations of various techniques described herein.

FIG. 11A is a graph 1100 of the range sidelobe envelope function 905 output by the SNR clipper 165 mentioned earlier with reference to step 255 in FIG. 2B. The horizontal axis 1110 indicates the sample number for the range sidelobe envelope function 905. The vertical axis 1115 indicates the amplitude of the range sidelobe envelope function 905. The negative regions 925 and 930 are raised to a zero or a value close to zero. The resulting range sidelobe envelope function 905 can now be used to suppress the range sidelobes 560 in the compressed signal 510.

The 'black level' (where all signals below this level are not displayed to the end user) may be set to 0 dB. The mean of the system noise floor can be 0 dB SNR. The compressed signal level may be set to give the desired probability of a "false alarm" caused by system noise, or how often random noise peaks will appear above the black level. The ratio of the mean system noise level to the black level is referred to as "minimum SNR" and can be set from 6-10 dB.

The range sidelobe envelope function is adjusted positively by an amount equal to the minimum SNR. As a result, after the compressed signal is divided (or log subtracted) with the range sidelobe envelope function 905, the sidelobes will be suppressed below the black level. The range sidelobes will not be visible to the end user and signal loss is kept to a minimum.

The minimum SNR adjustment to the range sidelobe envelope may be made first. Then, negative values may be set to zero. Setting negative values to zero may be necessary to ensure that, after compressed signal is divided by the range sidelobe envelope function (or log subtracted), that no signals or noise below the black level are pushed above the black level.

Figure 11B:
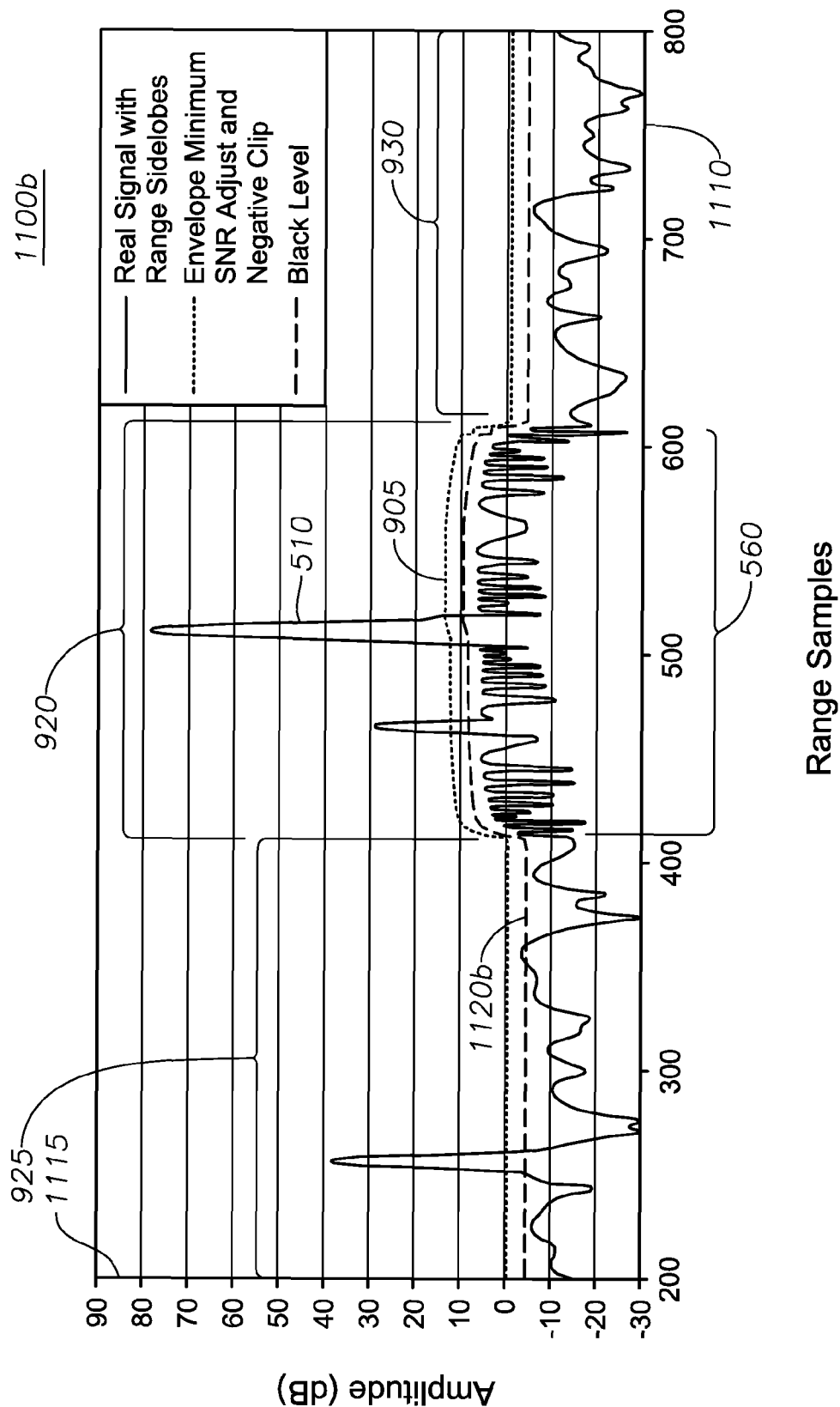
FIG. 11B is a graph of a compressed signal with a local raised black level that will suppress the sidelobes in accordance with implementations of various techniques described herein.

FIG. 11B is a graph 1100b of the range sidelobe envelope function showing the 'black level', 1120b with a local region raised by the range sidelobe envelope. Signals below the 'black level' are suppressed. The detailed description describes lowering the compressed signal to implement suppression, but an alternative approach is to raise the 'black level' in the region of the sidelobes. In both approaches the sidelobe envelope function is used to reduce the amplitude separation between the compressed signal and the 'black level'.

IV. Output

Figure 12:
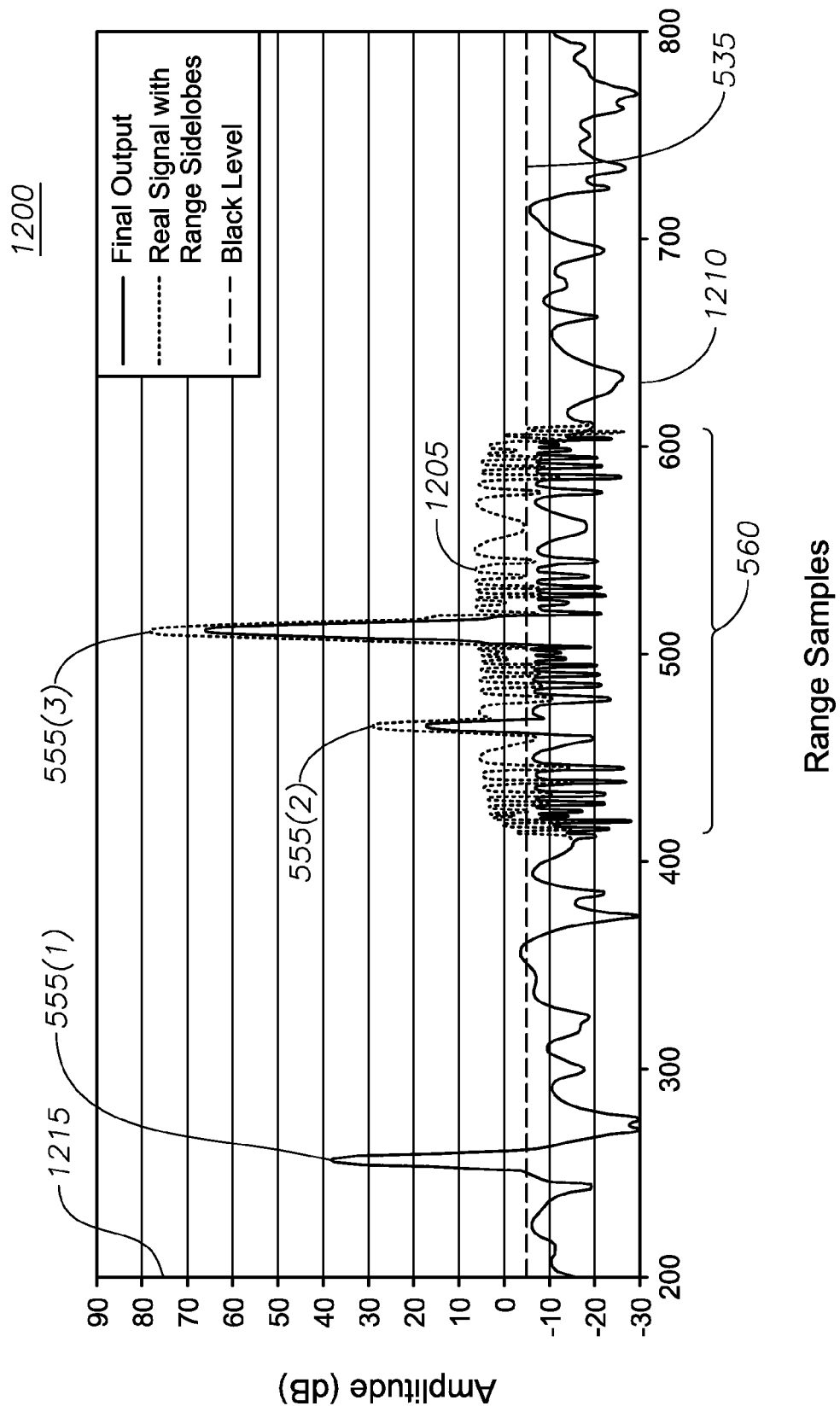
FIG. 12 is a graph of a compressed signal with suppressed sidelobes in accordance with implementations of various techniques described herein.

FIG. 12 is a graph 1200 of the compressed signal with suppressed sidelobes 1205 output by the divider 145 that was mentioned earlier with reference to step 230. The horizontal axis 1210 indicates the sample number for the compressed signal with suppressed sidelobes 1205. The vertical axis 1215 indicates the amplitude for the compressed signal with suppressed sidelobes 1205. The compressed signal with suppressed sidelobes 1205 output by the divider 145 considerably suppresses the range sidelobes 560 to below the threshold 535, while maintaining correlation spikes 555(1), 555(2), and 555(3). Correlation spikes 555(2) and 555(3), corresponding to targets 2 and 3, are only minimally reduced and are clearly visible.

V. Linear Magnitude

Figure 13:
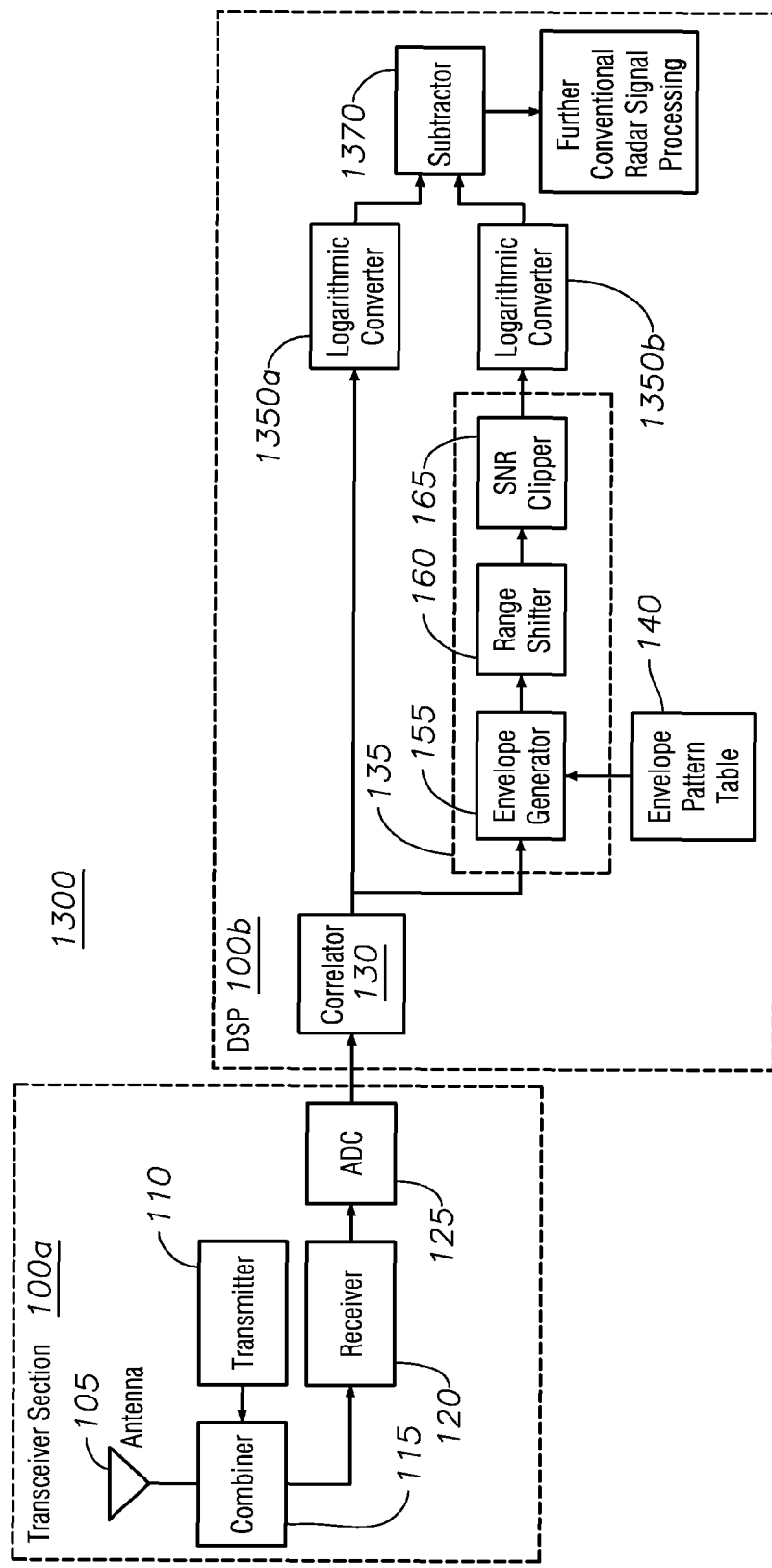
FIG. 13 illustrates a block diagram of a pulse compression radar with linear magnitude in accordance with implementations of various techniques described herein.

FIG. 13 illustrates a block diagram describing another pulse compression radar system 1300 in accordance with techniques presented herein. Radar system 1300 has the same components/modules as radar system 100, except for logarithmic converters 1350a, 1350b and a subtractor 1370. Logarithmic converters 1350a, 1350b convert the compressed signal of the correlator 130, and the output of the range sidelobe generator 135, respectively. The subtractor 1370 then subtracts the logarithmically converted output of the range sidelobe generator 135 from the logarithmically converted compressed signal from the correlator 130.

Figure 14A:
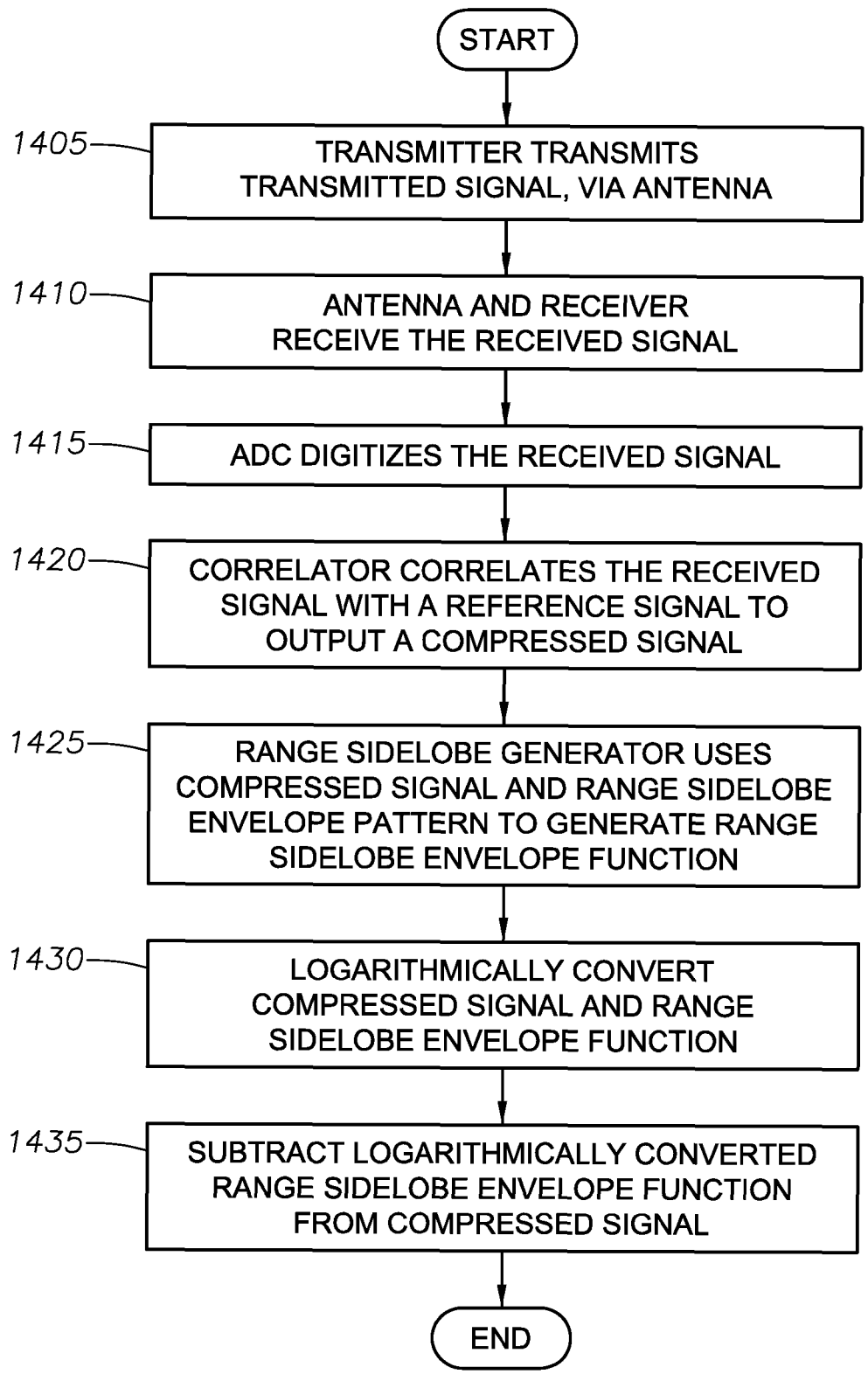
FIG. 14A is a flow diagram of a method for locating objects in a linear magnitude pulse radar compression system in accordance with implementations of various techniques described herein.
Figure 14B:
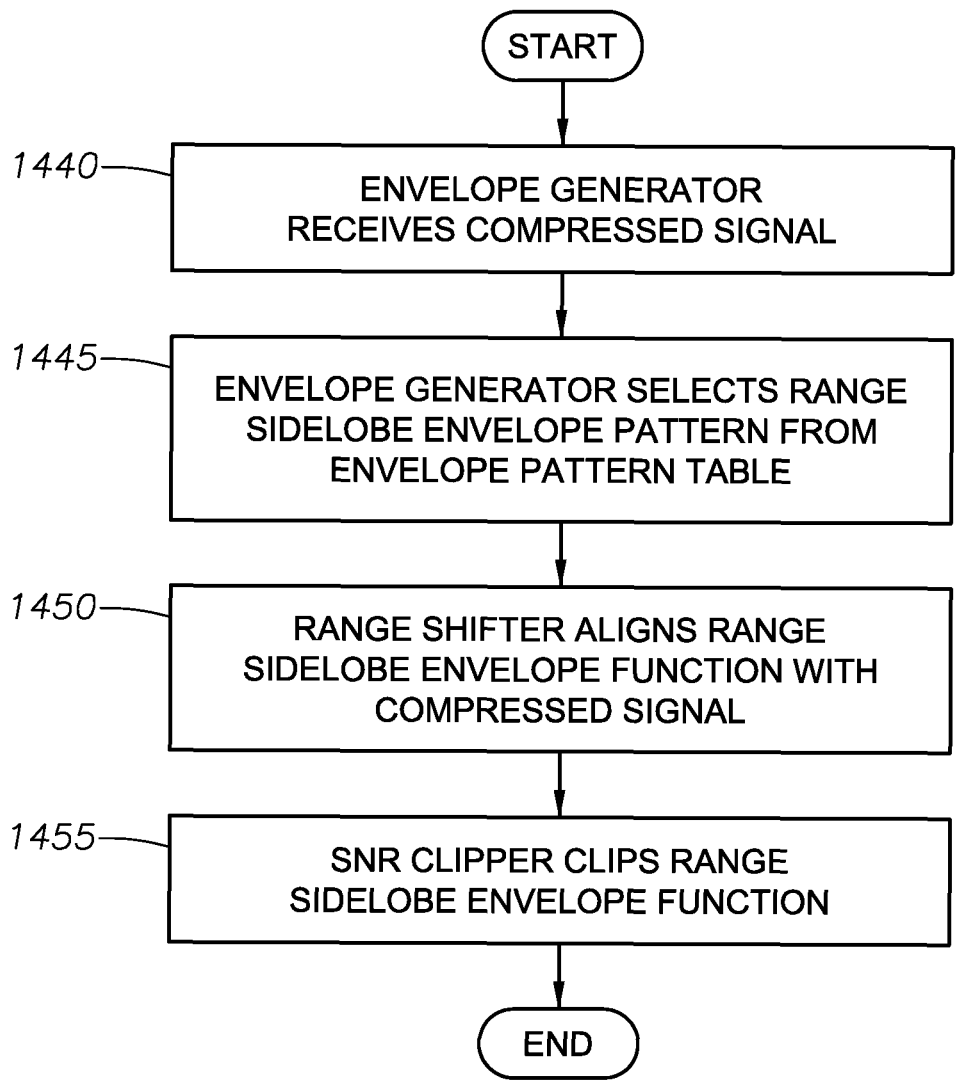
FIG. 14B illustrates a flow diagram of a method for suppressing range sidelobes in a linear magnitude pulse radar compression system in accordance with implementations of various techniques described herein.

FIGS. 14A-14B are flow diagrams in accordance with techniques described herein. In one implementation, these flow diagrams are performed by the pulse compression radar system 1300 mentioned in FIG. 13. FIG. 14A is a flow diagram in accordance with techniques described herein. At step 1405, the transmitter 110 transmits a transmitted signal via antenna 105. At step 1410, the antenna 105 and the receiver 120 receive the received signal. At step 1415, the ADC 125 digitizes the received signal, resulting in a digitized signal (for purposes of this document, received signal shall refer to both the analog received signal and the digitized received signal).

At step 1420, the correlator 130 correlates the received signal with a reference signal that represents the transmitted signal, outputting the compressed signal. At step 1425 (described in greater detail with reference to FIG. 14B), the range sidelobe generator 135 uses the compressed signal and a selected envelope pattern table 140 to generate a range sidelobe envelope function. At step 1430, the logarithmic converters 1350a, 1350b logarithmically convert the compressed signal and the range sidelobe envelope function, respectively. At step 1435, the subtractors 1370 subtracts the converted range sidelobe envelope function from the compressed signal.

FIG. 14B is a flow diagram in accordance with techniques described herein. At step 1440, the range sidelobe envelope generator 140 receives the compressed signal. At step 1445, the range sidelobe envelope generator 140 selects a range sidelobe envelope pattern from the envelope pattern table 140. The output of the envelope generator 145 includes a region that mimics the range sidelobes of the compressed signal. However, (1) the region that mimics the range sidelobes of the compressed signal is not aligned with the compressed signal; and (2) includes regions that have negative values. At step 1450, the range shifter 150 aligns the range sidelobe envelope function with the compressed signal. The SNR clipper 165 clips the range sidelobe envelope function at step 1455 from the negative values to either zero or a value close to zero.

VI. Computer-Readable Media

Figure 15:
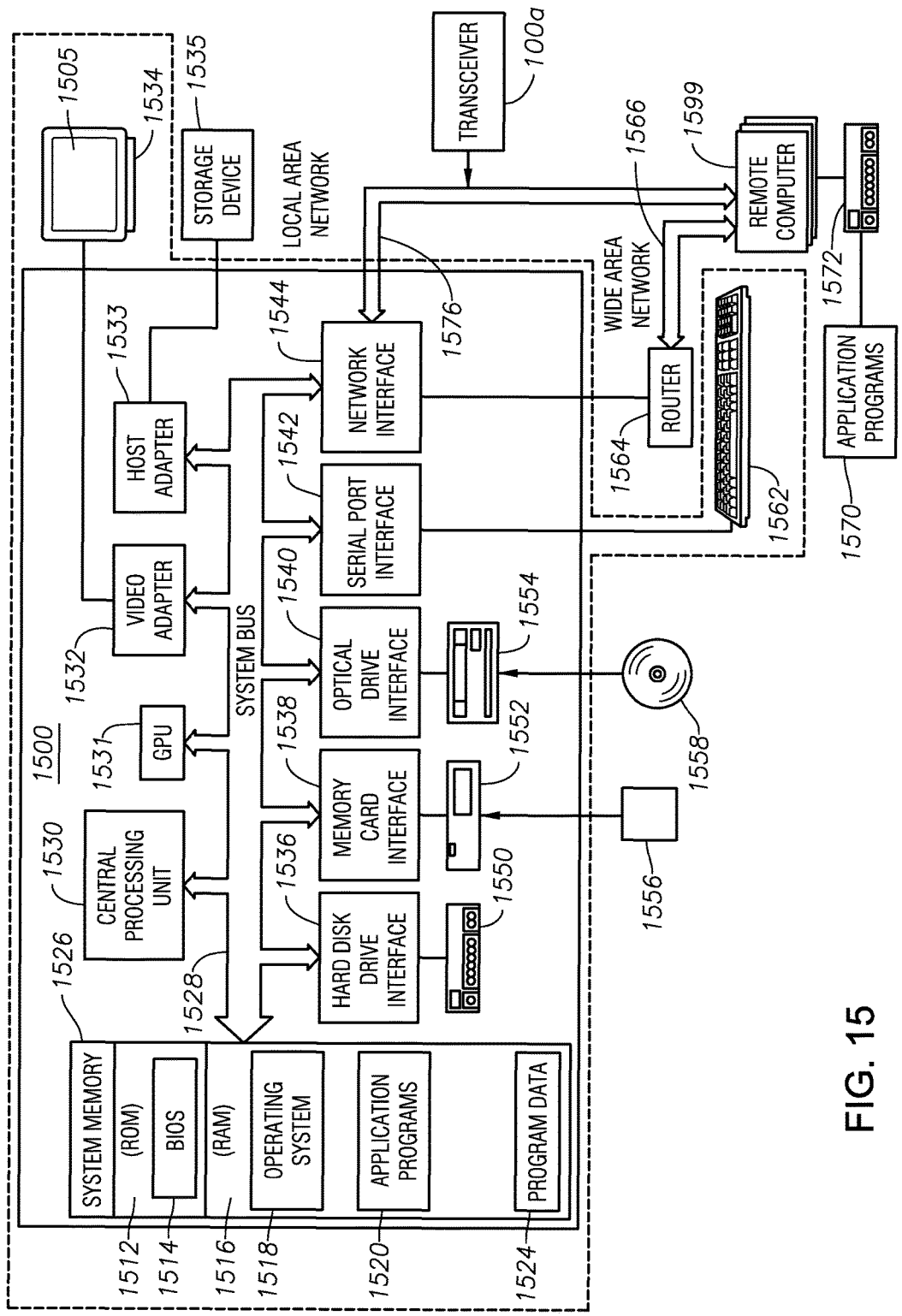
FIG. 15 illustrates a block diagram of a computer system in accordance implementations of various techniques described herein.

FIG. 15 illustrates a computing system 1500 in accordance with implementations of various techniques described herein. The computing system 1500 may include a central processing unit (CPU) 1530, a system memory 1526, a graphics processing unit (GPU) 1531 and a system bus 1528 that couples various system components including the system memory 1526 to the CPU 1530. Although only one CPU 1530 is illustrated in FIG. 15, it should be understood that in some implementations the computing system 1500 may include more than one CPU 1530.

The CPU 1530 may include a microprocessor, a microcontroller, a processor, a programmable integrated circuit, or a combination thereof. The CPU 1530 can comprise an off-the-shelf processor such as a Reduced Instruction Set Computer (RISC), or a Microprocessor without Interlocked Pipeline Stages (MIPS) processor, or a combination thereof. The CPU 1530 may also include a proprietary processor.

The GPU 1531 may be a microprocessor specifically designed to manipulate and implement computer graphics. The CPU 1530 may offload work to the GPU 1531. The GPU 1531 may have its own graphics memory, and/or may have access to a portion of the system memory 1526. As with the CPU 1530, the GPU 1531 may include one or more processing units, and each processing unit may include one or more cores.

The CPU 1530 may provide output data to a GPU 1531. The GPU 1531 may generate graphical user interfaces that present the output data. The GPU 1531 may also provide objects, such as menus, in the graphical user interface. A user may provide inputs by interacting with the objects. The GPU 1531 may receive the inputs from interaction with the objects and provide the inputs to the CPU 1530. A video adapter 1532 may be provided to convert graphical data into signals for a monitor 1534. The monitor 1534 includes a screen 1505. In certain implementations, the screen 1505 may be sensitive to touching by a finger. In other implementations, the screen 1505 may be sensitive to the body heat from the finger, a stylus, or responsive to a mouse.

The system bus 1528 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 1526 may include a read only memory (ROM) 1512 and a random access memory (RAM) 1516. A basic input/output system (BIOS) 1514, containing the basic routines that help transfer information between elements within the computing system 1500, such as during start-up, may be stored in the ROM 1512.

The computing system 1500 may further include a hard disk drive interface 1536 for reading from and writing to a hard disk 1550, a memory card reader 1552 for reading from and writing to a removable memory card 1556, and an optical disk drive 1554 for reading from and writing to a removable optical disk 1558, such as a CD ROM or other optical media. The hard disk 1550, the memory card reader 1552, and the optical disk drive 1554 may be connected to the system bus 1528 by a hard disk drive interface 1536, a memory card reader interface 1538, and an optical drive interface 1540, respectively. The drives and their associated computer-readable media may provide nonvolatile storage of computer-readable instructions, data structures, program modules and other data for the computing system 1500.

Although the computing system 1500 is described herein as having a hard disk, a removable memory card 1556 and a removable optical disk 1558, it should be appreciated by those skilled in the art that the computing system 1500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1500. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 1500 may also include a host adapter 1533 that connects to a storage device 1535 via a small computer system interface (SCSI) bus, a Fiber Channel bus, an eSATA bus, or using any other applicable computer bus interface.

The computing system 1500 can also be connected to a router 1564 to establish a wide area network (WAN) 1566 with one or more remote computers 1574. The router 1564 may be connected to the system bus 1528 via a network interface 1544. The remote computers 1574 can also include hard disks 1572 that store application programs 1570.

In another implementation, the computing system 1500 may also connect to the remote computers 1574 via local area network (LAN) 1576 or the WAN 1566. When using a LAN networking environment, the computing system 1500 may be connected to the LAN 1576 through the network interface or adapter 1544. The LAN 1576 may be implemented via a wired connection or a wireless connection. The LAN 1576 may be implemented using Wi-Fi™ technology, cellular technology, Bluetooth™ technology, satellite technology, or any other implementation known to those skilled in the art. The network interface 1544 may also utilize remote access technologies (e.g., Remote Access Service (RAS), Virtual Private Networking (VPN), Secure Socket Layer (SSL), Layer 15 Tunneling (L2T), or any other suitable protocol). These remote access technologies may be implemented in connection with the remote computers 1574. It will be appreciated that the network connections shown are exemplary and other means of establishing a communications link between the computer systems may be used.

A number of program modules may be stored on the hard disk 1550, memory card 1556, optical disk 1558, ROM 1512 or RAM 1516, including an operating system 1518, one or more application programs 1520, and program data 1524. In certain implementations, the hard disk 1550 may store a database system. The database system could include, for example, recorded points. The application programs 1520 may include various mobile applications ("apps") and other applications configured to perform various methods and techniques described herein. The operating system 1518 may be any suitable operating system that may control the operation of a networked personal or server computer.

A user may enter commands and information into the computing system 1500 through input devices such as buttons 1562, which may be physical buttons, virtual buttons, or combinations thereof. Other input devices may include a microphone, a mouse, or the like (not shown). These and other input devices may be connected to the CPU 1530 through a serial port interface 1542 coupled to system bus 1528, but may be connected by other interfaces, such as a parallel port, game port or a universal serial bus (USB).

Certain implementations may be configured to be connected to the transceiver section 100a of a pulse compression radar system 100. In one implementation, the one or more application programs 1520 or 1570 stored in the computer-readable media can include a plurality of instructions that when executed by a processing unit, such as a CPU 1530, cause the computing system to perform any of the techniques, or portions thereof, that are described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, one implementation can include a sound navigation and ranging (SONAR) system, wherein the antenna 105 is replaced with a sound transducer and the relationship between the time delay and distances is based on the speed of sound in water instead of the speed of light.

Additionally, as an alternative to applying the side lobe suppression by reducing the compressed signal, it is also possible to raise the local black level and keep the compressed signal at the original level.

Certain techniques described herein advantageously minimize target loss through optimal matching of the range sidelobe envelope to the correlated or compressed signal. The performance is not affected by target scenario. Additionally, usage of an envelope pattern table 140 allows for storage of a variety of envelope shapes and functions, which can even be programmed after manufacture. Where pulse compression may require a number of chirps with different parameters to cover the complete radar range, an optimal envelope function can be applied to each type.

The invention claimed is:

1. A system for processing a signal, the system comprising:
    a receiver for receiving the signal;
    a correlator for compressing the signal with a reference signal, thereby resulting in a compressed signal; and
    a range sidelobe envelope generator for generating, using a maximum convolution function, a range sidelobe envelope function based on the compressed signal.

2. The system of claim 1, wherein the reference signal comprises a chirp signal.

3. The system of claim 1, wherein the signal is compressed using auto-correlation.

4. The system of claim 1, further comprising:
    an envelope pattern table for storing a plurality of range sidelobe envelope patterns; and
    wherein the range sidelobe envelope generator selects one of the range sidelobe envelope patterns, resulting in a selected range sidelobe envelope pattern.

5. The system of claim 4, wherein the selected range sidelobe envelope pattern comprises a first plurality of samples and wherein the compressed signal comprises a second plurality of samples, and wherein the range sidelobe envelope generator further comprises:
    a first multiplier for multiplying a first one of the first plurality of samples of the selected range sidelobe envelope pattern and a first one of the second plurality of samples of the compressed signal, resulting in a first product;
    a second multiplier for multiplying a second one of the first plurality of samples of the selected range sidelobe envelope pattern and a second one of the second plurality of samples of the compressed signal, resulting in a second product; and
    wherein the range sidelobe envelope generator selects a larger product of the first product and the second product.

6. The system of claim 1, further comprising:
    a range shifter for aligning the range sidelobe envelope function with the compressed signal.

7. The system of claim 6, further comprising:
    a clipper for clipping values of the range sidelobe envelope function that are below a predetermined value to the predetermined value.

8. An apparatus for processing a signal, the apparatus comprising:
    receiver operable to receive the signal; and
    a non-transitory computer-readable medium connected to the receiver, the non-transitory computer readable medium having stored thereon computer-executable instructions which, when executed by a computer, cause the computer to:
    compress the signal with a reference signal, thereby resulting in a compressed signal; and
    generate, using a maximum convolution function, a range sidelobe envelope function from the compressed signal.

9. The apparatus of claim 8, wherein compressing the signal further comprises auto-correlating the signal.

10. The apparatus of claim 8, wherein the non-transitory computer-readable medium further comprising computer-executable instructions that cause the computer to:
    select a particular one of a plurality of range sidelobe envelope patterns, resulting in a selected range sidelobe envelope pattern.

11. The apparatus of claim 10, wherein the selected range sidelobe envelope pattern comprises a first plurality of samples and wherein the compressed signal comprises a second plurality of samples, and wherein the non-transitory computer-readable medium further comprising computer-executable instructions that cause the computer to:
    multiply a first one of the first plurality of samples of the selected range sidelobe envelope pattern and a first one of the second plurality of samples of the compressed signal, resulting in a first product;
    multiply a second one of the first plurality of samples of the selected range sidelobe envelope pattern and a second one of the second plurality of samples of the compressed signal, resulting in a second product; and
    select a larger product of the first product and the second product.

12. The apparatus of claim 8, wherein the non-transitory computer-readable medium further comprising computer-executable instructions that cause the computer to:

align the range sidelobe envelope function with the compressed signal.

13. The apparatus of claim 12, wherein the non-transitory computer-readable medium further comprising computer-executable instructions that cause the computer to:
clip the range sidelobe envelop function from values that are below a predetermined value to the predetermined value, thereby resulting in a clipped range sidelobe envelope.

14. A method for processing a radar signal, comprising:
receiving the radar signal with a receiver;
correlating the radar signal with a reference signal, thereby resulting in a compressed signal; and
generating, using a maximum convolution function, a range sidelobe envelope function based on the compressed radar signal.

15. The method of claim 14, wherein the radar signal comprises a radar chirp signal.

16. The method of claim 14, wherein compressing the radar signal comprises auto-correlating the radar signal.

17. The method of claim 14, wherein generating the range sidelobe envelope function comprises:
selecting a particular one of a plurality range sidelobe envelope patterns, resulting in a selected range sidelobe envelope pattern.

18. The method of claim 17, wherein the selected range sidelobe envelope pattern further comprises a first plurality of samples and wherein the compressed signal comprises a second plurality of samples, wherein the method further comprises:
multiplying a first one of the first plurality of samples of the selected range sidelobe envelope pattern and a first one of the second plurality of samples of the compressed signal, resulting in a first product;
multiplying a second one of the first plurality of samples of the range sidelobe envelope function and a second one of the second plurality of samples of the compressed signal, resulting in a second product; and
selecting a larger product of the first product and the second product.

19. The method of claim 14, further comprising:
aligning the range sidelobe envelope function with the compressed signal.

20. The method of claim 19, further comprising:
clipping the range sidelobe envelop function from values that are below a first predetermined value to a second predetermined value, thereby resulting in a clipped range sidelobe envelope; and
reducing the compressed signal by the amount of the clipped range sidelobe envelope.

21. A system for processing, a signal, the system comprising:
a receiver for receiving the signal;
a correlator for compressing the signal with a reference signal, thereby resulting in a compressed signal;
a range sidelobe envelope generator for generating a range sidelobe envelope function based on the compressed signal;
a range shifter for aligning the range sidelobe envelope function with the compressed signal; and
a clipper for clipping values of the range sidelobe envelope function that are below a predetermined value to the predetermined value.

22. An apparatus for processing a signal, the apparatus comprising:
receiver operable to receive the signal; and
a non-transitory computer-readable medium connected to the receiver, the non-transitory computer readable medium having stored thereon computer-executable instructions which, when executed by a computer, cause the computer to:
compress the signal with a reference signal, thereby resulting in a compressed signal;
generate a range sidelobe envelope function from the compressed signal;
align the range sidelobe envelope function with the compressed signal; and
clip the range sidelobe envelop function from values that are below a predetermined value to the predetermined value, thereby resulting in a clipped range sidelobe envelope.

23. A method for processing a radar signal, comprising:
receiving the radar signal with a receiver;
correlating the radar signal with a reference signal, thereby resulting in a compressed signal;
generating a range sidelobe envelope function based on the compressed radar signal;
aligning the range sidelobe envelope function with the compressed signal;
clipping the range sidelobe envelop function from values that are below a first predetermined value to a second predetermined value, thereby resulting in a clipped range sidelobe envelope; and
reducing the compressed signal by the amount of the clipped range sidelobe envelope.

* * * * *

UNITED STATES PATENT AND TRADEMARK OFFICE
CERTIFICATE OF CORRECTION

PATENT NO. : 9,739,873 B2
APPLICATION NO. : 14/463448
DATED : August 22, 2017
INVENTOR(S) : Lindsay Lilburn and Roger Phillips It is certified that error appears in the above-identified patent and that said Letters Patent is hereby corrected as shown below:

In the Claims

Claim 21, Column 18, Line 3, "A system for processing, a signal, the system com-" should read as the following: "A system for processing a signal, the system com-"

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*